US012747335B2

(12) United States Patent
Giannini et al.

(10) Patent No.: US 12,747,335 B2
(45) Date of Patent: Sep. 29, 2026

(54) COMPOSITIONS FOR ELASTOMERIC COMPOUNDS COMPRISING TETRAZOLE COMPATIBILIZING AGENTS AND TYRES COMPRISING THE SAME

(71) Applicant: Pirelli Tyre S.p.A., Milan (IT)

(72) Inventors: Luca Giannini, Milan (IT); Luciano Tadiello, Milan (IT); Antonio Papagni, Milan (IT); Mauro Monti, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 892 days.

(21) Appl. No.: 18/001,999

(22) PCT Filed: Jun. 25, 2021

(86) PCT No.: PCT/IB2021/055644
§ 371 (c)(1),
(2) Date: Dec. 15, 2022

(87) PCT Pub. No.: WO2021/260365
PCT Pub. Date: Dec. 30, 2021

(65) Prior Publication Data

US 2023/0257552 A1 Aug. 17, 2023

(30) Foreign Application Priority Data

Jun. 26, 2020 (IT) ........................ 102020000015514

(51) Int. Cl.
*C08K 5/3472* (2006.01)
*B60C 1/00* (2006.01)
*C08K 3/36* (2006.01)

(52) U.S. Cl.
CPC .............. *C08K 5/3472* (2013.01); *B60C 1/00* (2013.01); *C08K 3/36* (2013.01)

(58) Field of Classification Search
CPC .......... C08K 5/3472; C08K 3/36; B60C 1/00; B60C 2001/0033; B60C 2001/005; B60C 2001/0058; B60C 1/0008; B60C 1/0025; B60C 1/0016
See application file for complete search history.

(56) References Cited

FOREIGN PATENT DOCUMENTS

| | | | | |
|---|---|---|---|---|
| JP | S62215640 | A | | 9/1987 |
| JP | 62263239 | A | * | 11/1987 |
| JP | S62263239 | A | | 11/1987 |
| JP | 2009007511 | A | * | 1/2009 |
| JP | 2017-039824 | A | | 2/2017 |

(Continued)

OTHER PUBLICATIONS

JPS62263239A_-_machine_translation (Year: 1987).*
(Continued)

*Primary Examiner* — Doris L Lee
(74) *Attorney, Agent, or Firm* — Finnegan, Henderson, Farabow, Garrett & Dunner, L.L.P.

(57) ABSTRACT

The present invention relates to compositions for elastomeric compounds for tyres, comprising monotetrazole compatibilizing agents characterised by precise activation temperatures, tyre components and tyres for vehicle wheels which comprise them. Advantageously, the present monotetrazole compatibilizing agents allow the breaking properties of the compounds to be improved while maintaining a high compatibilisation of the filler.

25 Claims, 13 Drawing Sheets

(56) References Cited

FOREIGN PATENT DOCUMENTS

| | | | |
|---|---|---|---|
| JP | 2017-165836 | | 9/2017 |
| WO | WO 2016/050887 | A1 | 4/2016 |
| WO | WO 2016/174628 | A1 | 11/2016 |
| WO | WO 2016/174629 | A1 | 11/2016 |
| WO | WO 2018/078480 | A1 | 5/2018 |
| WO | WO 2019/229692 | A1 | 12/2019 |

OTHER PUBLICATIONS

JP_2009007511_A_I_-_machine_translation (Year: 2009).*

International Search Report form the European Patent Office in corresponding International Application No. PCT/IB2021/055644 mailed Oct. 20, 2021.

Written Opinion of the International Searching Authority from the European Patent Office in corresponding International Application No. PCT/IB2021/055644 mailed Oct. 20, 2021.

Schwartz, Norman V., “Ditetrazoles as Crosslinking Agents” Journal of Applied Polymer Science, pp. 2715-2720, vol. 16, Oct. 1, 1972.

* cited by examiner 1.1

1.3

5A

5B 1.3

MONOTETRAZ. 3.2
Ta 150°C

MONOTETRAZ. 3.3
Ta 180°C

MONOTETRAZ. 3.5
Ta 230°C

COMPOSITIONS FOR ELASTOMERIC COMPOUNDS COMPRISING TETRAZOLE COMPATIBILIZING AGENTS AND TYRES COMPRISING THE SAME

This application is a national stage filing under 35 U.S.C. § 371 of International Application No. PCT/IB2021/055644, filed on Jun. 25, 2021, which claims the benefit of priority to Italian Application No. 102020000015514, filed on Jun. 26, 2020, the disclosure of this application is incorporated herein by reference in their entirety.

The present invention relates to compositions for elastomeric compounds for tyres, comprising tetrazole compatibilizing agents characterised by precise activation temperatures, tyre components and tyres for vehicle wheels which comprise them.

PRIOR ART

In the rubber industry, and more particularly in the tyre industry, it is known to add reinforcing fillers to the elastomeric compositions in order to improve the mechanical properties thereof.

Due to its high reinforcing power, carbon black is the most commonly used filler. Carbon black imparts a strong hysteresis to the articles, i.e. it increases the dissipated heat under dynamic conditions.

Alternatively, the so-called "white" reinforcing fillers are in use, such as chalk, talc, kaolin, bentonite, titanium dioxide and especially silica, fillers which may partially or totally replace the carbon black in elastomeric compositions, and impart a lower rolling resistance, a good grip in the wet and at the same time a sufficient reinforcement to the tyres.

The elastomeric compositions comprising white fillers, in particular silica, can therefore be advantageously used in tyres subject to different performances such as high performance tyres HP, summer tyres, all seasons or winter.

For such uses, silicas with different features are commercially available or can be prepared according to known processes.

In order for the elastomeric compound to have the desired properties, however, it is important that the reinforcing filler is homogeneously distributed in the elastomer and that it remains so over time, avoiding the formation of agglomerates as much as possible.

The distribution and dispersion of the fillers in the matrix depend both on their chemical nature and on the mechanical energy used to mix them. In particular, a better distribution and dispersion is achieved the more similar their chemical nature is, that is, the more they are compatible, and the greater the mechanical stress applied. Typically, in tyre compounds, to improve the dispersion and compatibility between "white" fillers, or inorganic fillers that have surface hydroxyl groups, such as silicates, carbonates or amorphous silica, and rubber, we use agents called compatibilisers or coupling agents.

Among the most used coupling agents are the polysulphide silane coupling agents, such as for example bis(3-triethoxysilyl-propyl)tetrasulphide TESPT and bis(3-triethoxysilyl-propyl)$_d$isulphide TESPD.

These agents have a silane head, capable of reacting with the surface hydroxyl groups of the fillers, and polysulphide units which, upon heating, decompose producing sulphydryl radicals capable of reacting with the elastomer, but with not always optimal results.

It is in fact known that the thermal decomposition of these polysulphide systems is difficult to control, as it can already take place at low temperatures, well before the vulcanisation step (see for example chapter 3, par. 3.17 of the book "Silane coupling, Compounding Precipitated Silica in Elastomers", Hewitt, Ciullo, William Andrew Publishing, 2007). Furthermore, the radical species thus generated have high reactivity and poor selectivity leading to the formation of mixtures of mono- and disulphides.

To homogeneously distribute these polysulphide compatibilisers it is necessary to carefully control the internal temperature in the mixers in order to avoid that reactions with the elastomer occur before a satisfactory distribution of the silica and of the compatibilisers themselves occurs.

Typically, this mixing step—called non-productive step (i) or first step—is carried out at temperatures not exceeding 140° C.

However, despite the use of compatibilisers and high-energy mixing, the Applicant has observed that it is not always possible to reach and above all to maintain the optimal dispersion of the reinforcing fillers in the elastomeric matrix.

In fact, the disulphide bonds of the compatibiliser with the elastomer are not sufficiently stable, as they can break over time and under particular conditions, and thus allow the migration and re-aggregation of the filler.

A good dispersion of the reinforcing fillers is an important requirement for obtaining compositions suitable for use in tyres. In fact, an inhomogeneous dispersion, with the formation of numerous and/or bulky aggregates, reflects negatively on the performance of the material itself, resulting for example in an excessive hysteresis or in a poor breaking behaviour.

Furthermore, in the case of compounds of elastomers with different polarity, migration and accumulation of the fillers may occur mainly in the more similar steps and consequently the appearance of problems related to the inhomogeneity of the compound, such as for example high aggregate abrasion and uncontrolled hysteresis of the compound, as well as potential crack initiation.

In the tyre, all this translates into high energy dissipation and excessive sensitivity to mechanical stresses up to rupture.

On the other hand, it would be desirable to be able to distribute the fillers in the elastomeric material in a homogeneous way in order to then ideally be able to maintain this homogeneity throughout the mixing process and during all the subsequent steps of use of the material.

At the process level, it would also be advantageous to be able to prolong the mixing until the desired distribution is reached without having to strictly control the temperature and, subsequently, to be able to stably fix the well-dispersed fillers to the matrix, for example during vulcanisation.

SUMMARY OF THE INVENTION

The Applicant has undertaken studies to improve the affinity of the fillers for the elastomeric materials of the compounds and above all to stabilise the dispersion of the same obtained at the end of the mixing.

For this purpose, the Applicant's research has focused on compatibilizing agents capable on the one hand of interacting with the selected reinforcing filler and on the other hand of covalently binding, in a controlled and stable manner, to the elastomeric component of the compounds. It is known from the literature for example from J. K. Stille, A. T. Chen, Macromolecules, 378, 5, (1972), that 2,5-disubstituted tetrazoles, following heating or irradiation with ultraviolet light, decompose, with nitrogen development, generating highly reactive intermediate species (nitrilimines) able to react with double bonds (A=B), such as vinyl groups, as shown in the following Scheme 1:

Scheme 1

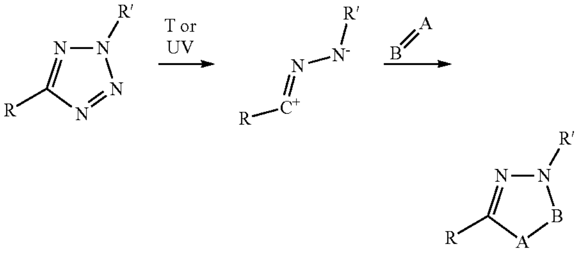

This reaction, called 1,3-dipolar cyclisation, leads to the formation of stable substituted pyrazolines, easily recognisable because they are fluorescent when exposed to ultraviolet radiation.

The temperature at which the 2,5-disubstituted tetrazole decomposes, herein also referred to as the activation temperature Ta, depends on the nature of the groups present in the 2,5 positions of the tetrazole, as discussed for example in the article J. Appl. Polym. Science, Vol. 28, pages 3671-3679 (1983) in Table 1, in the article Macromolecules Vol. 5, No. 4, (1972), p. 377-384, in Table 2, and as investigated by the Applicant in the present experimental part (Tables 1, and 2).

Document JP2009007511A relates to an elastomeric composition for tyre, comprising silica, a conventional silane coupling agent and a tetrazole derivative mono-substituted in position 5 of formula

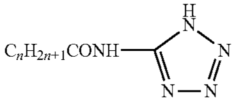

said composition exhibiting an improved affinity of the silica for the rubber and an increased vulcanisation rate. This document does not mention the possible thermal decomposition of those mono-substituted tetrazoles nor does it suggest the use of 2,5-disubstituted tetrazoles.

In this regard, the Applicant has experimentally verified that tetrazoles substituted only in 5 as those shown in this document decompose at very high temperatures, well above 220° C. (as shown by the TGA analysis of FIG. 2) of little practical interest.

Document JP2017039824A describes an elastomeric composition-comprising in addition to a silane coupling agent also a compound with three or more nitrogen atoms in a ring, for example a tetrazole and a sulphur atom outside the ring-which would exhibit a better reactivity between the silane coupling agent and the rubber. The description does not mention the possible thermal activation of that compound at certain temperatures.

The Applicant has experimentally verified that 5-mercapto-substituted tetrazoles such as these do not decompose clearly upon heating with the release of nitrogen but degrade slowly, as shown by the thermogram of FIG. 2.

Document JPS62263239A describes elastomeric compositions comprising natural or synthetic diene rubber, reinforcing fillers, in particular carbon black, and tetrazole compounds substituted with phenyls, in turn optionally substituted with carboxyl, $C_1$-$C_4$ alkyl, hydroxyl, halogen or alkoxy.

Document JPS62215640A discloses elastomeric compositions for tyres comprising diene rubbers, reinforcing fillers, in particular carbon black, and tetrazole compounds of formula II, III or IV (II)

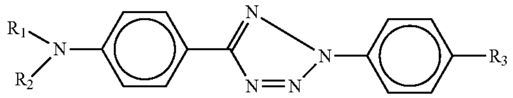

(III)

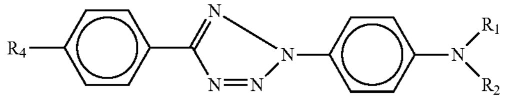

(IV)

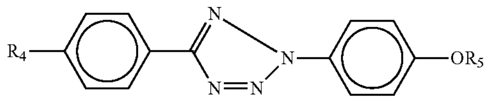

wherein $R_1$ and $R_2$ represent H, alkyl or aryl, $R_3$ represents H, alkyl aryl, halogen or —NXY wherein X and Y represent H, alkyl or aryl, $R_4$ represents H, alkyl, aryl or halogen, and $R_5$ represents H or alkyl.

In his studies, the Applicant has found that certain 2.5 disubstituted monotetrazoles prove to be excellent compatibilisers of reinforcing fillers for elastomers and that their activation, at a very precise and temperature modifiable ad hoc, allows the mixing process to be extended up to achievement of the desired dispersion and to proceed only later with the stable anchoring of the fillers on the elastomer.

Advantageously, if substituents on the tetrazole are selected such as to raise the activation temperature Ta thereof, it becomes possible to carry out the mixing steps with the elastomer without having to strictly control times and temperatures for fear of early reactions, which with the traditional polysulphide-based compatibilisers can already occur for example around 140° C.

Furthermore, it has been found that with the use of the present monotetrazole compatibilisers it is possible to stably anchor the fillers to the matrix and at least maintain or even improve the mechanical properties of the final compounds which incorporate them.

Therefore, a first aspect of the present invention is an elastomeric composition for tyre compounds comprising at least:

100 phr of at least one diene elastomeric polymer, at least 1 phr of at least a reinforcing filler, at least 0.1 phr of at least a monotetrazole compatibilizing agent of formula (I)

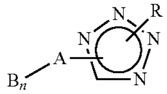

wherein

A is absent or represents an organic group (linker) at least divalent, optionally comprising one or more heteroatom(s), covalently bound to the position 2 or 5 of the tetrazole;

R is a group covalently bound to position respectively 5 or 2 of the tetrazole, selected from linear or branched $C_1$-$C_{10}$ alkyl; $C_6$-$C_{20}$ aryl; $C_3$-$C_{10}$ cycloalkyl; a saturated, unsaturated or aromatic mono or bicyclic, 5- or 6-membered, optionally benzocondensate heterocyclyl comprising at least one heteroatom selected from N, S, O; R being in turn optionally substituted with at least one electron withdrawing group X or an electron donor group Y, or R is a group B, B represents a group with high affinity for the reinforcing filler, selected from a silane substituted with $C_1$-$C_5$ alkoxyls, $C_1$-$C_5$ alkyls and/or $C_6$-$C_{10}$ aryls, a $(HO)_2B$— group, a saturated, unsaturated or aromatic mono or bicyclic, 5- or 6-membered, optionally benzocondensated heterocyclyl, comprising at least one heteroatom selected from N, S and O, or an aromatic polycyclic hydrocarbon n is an integer from 1 to 3, provided that groups A, B and R do not comprise any 2,5 disubstituted tetrazole; and 0 to 20 phr of a vulcanising agent.

A further aspect of the present invention is an elastomeric compound for tyres obtained by mixing and vulcanising the elastomeric composition according to the invention.

A further aspect of the present invention is a process for preparing an elastomeric compound according to the invention, which comprises:

mixing, in one or more steps, all the components of the composition according to the invention keeping the temperature at a value T1 lower than the activation temperature Ta of the at least one monotetrazole compatibilizing agent (I), to give a compound (1) comprising said monotetrazole compatibilizing agent (I) with the tetrazole unreacted, heating the compound (1) to a temperature T2 equal to or higher than the activation temperature Ta of the monotetrazole compatibilizing agent (I), to give a compound (2) wherein said at least one monotetrazole compatibilizing agent (I) has reacted at least partially by tetrazole decomposition and subsequent addition to the diene elastomeric polymer, and optionally vulcanising the compound.

A further aspect of the present invention is a tyre component for vehicle wheels comprising, or preferably consisting of, an elastomeric compound, according to the invention.

A further aspect of the present invention is a tyre for vehicle wheels comprising at least one component of a tyre according to the invention.

The present monotetrazole compatibilizing agent (I), when incorporated and vulcanised in elastomeric compounds for tyres, imparts better and dynamic static mechanical properties to the same at least comparable to those found with the classic polysulphide compatibilizing agents.

Advantageously, by varying the type of substituents on the tetrazole ring, it is possible to suitably modulate the activation temperature Ta of the monotetrazole compatibilizing agent (I) and obtain process advantages not achievable with conventional polysulphide compatibilizing agents.

Definitions

The term "monotetrazole compatibilizing agent" refers to a compound comprising a single 2,5 disubstituted tetrazole, i.e. a single tetrazole capable of releasing nitrogen upon reaching a precise temperature with the formation of nitrilimine as explained above. In the present compatibilizing agent (I) it is possible, although not preferred, that other tetrazoles otherwise substituted and thermally stable at the activation temperature Ta of said single 2,5 disubstituted tetrazole are present.

The term "electron donor group X" means an atom or a group of atoms which contributes to increasing the electron density on nearby atoms such as for example the group —$CH_3$, —OH, —OR, —$NH_2$.

The term "electron withdrawing group X" means an atom or a group of atoms which contributes to reducing the electron density on nearby atoms such as the groups —$NO_2$, —CN, —COOH and halogens.

The term "group with high affinity for the reinforcing filler" B means a functional group capable of interacting with the reinforcing filler, in particular with the surface hydroxyl groups of silica or with the amorphous carbon of carbon black, forming bonds of the covalent or ionic type, or even through weaker interactions of the Van der Waals type, such as dipole-dipole bonds, for example hydrogen bonds.

The term "polysulphide compatibilizing agent" means a compound that contains a polysulphide unit $S_n$, where n is a number equal to 2 or greater which indicates the number of sulphur atoms present in the polysulphide unit, and at least one group with a high affinity for the filler, in particular for silica and silicates. Upon heating, the polysulphide unit decomposes producing sulphydryl radicals capable of reacting with the double bonds of the elastomer.

The term "activation temperature Ta" of the monotetrazole compatibilizing agent (I) means the temperature at which the 2,5 disubstituted tetrazole decomposes with loss of nitrogen and formation of the intermediate nitrilimine.

The term "elastomeric composition for tyre compounds" means a composition comprising at least one diene elastomeric polymer and one or more additives, which by mixing and possible heating provides an elastomeric compound suitable for use in tyres and their components.

The components of the elastomeric composition are not generally introduced simultaneously into the mixer but typically added in sequence. In particular, the vulcanisation additives, such as the vulcanising agent and possibly the accelerant and retardant agents, are usually added in a downstream step with respect to the incorporation and processing of all the other components.

In the final vulcanisable elastomeric compound, the individual components of the elastomeric composition may be altered or no longer individually traceable as modified, completely or in part, due to the interaction with the other components, of heat and/or mechanical processing. The term "elastomeric composition" herein is meant to include the set of all the components that are used in the preparation of the elastomeric compound, regardless of whether they are actually present simultaneously, are introduced sequentially or are then traceable in the elastomeric compound or in the final tyre.

The term "elastomeric compound" indicates the compound obtainable by mixing and possibly heating at least one elastomeric polymer with at least one of the additives commonly used in the preparation of tyre compounds.

The term "non-vulcanisable elastomeric compound" indicates the compound obtainable by mixing and possibly heating at least one elastomeric polymer with at least one of the additives commonly used in the preparation of tyre compounds, with the exception of vulcanising agents.

The term "vulcanisable elastomeric compound" indicates the elastomeric compound ready for vulcanisation, obtainable by incorporation into a non-vulcanisable elastomeric compound of all the additives, including those of vulcanisation.

The term "vulcanised elastomeric compound" means the material obtainable by vulcanisation of a vulcanisable elastomeric compound.

The term "green" indicates a material, a compound, a composition, a component or a tyre not yet vulcanised.

The term "vulcanisation" refers to the cross-linking reaction in a natural or synthetic rubber induced, for example, by a sulphur-based vulcanising agent.

The term "vulcanising agent" indicates a product capable of transforming natural or synthetic rubber into elastic and resistant material due to the formation of a three-dimensional network of inter- and intra-molecular bonds.

The term "vulcanisation accelerant" means a compound capable of decreasing the duration of the vulcanisation process and/or the operating temperature, such as TBBS, sulphenamides in general, thiazoles, dithiophosphates, dithiocarbamates, guanidines, as well as sulphur donors such as thiurams.

The term "vulcanisation activating agent" indicates a product capable of further facilitating the vulcanisation, making it happen in shorter times and possibly at lower temperatures. An example of activating agent is the stearic acid-zinc oxide system.

The term "vulcanisation retardant" means a product capable of delaying the onset of the vulcanisation reaction and/or suppressing undesired secondary reactions, for example N-(cyclohexylthio)phthalimide (CTP).

The term "vulcanisation package" means the set of vulcanising agent and one or more vulcanisation additives selected from vulcanisation activating agents, accelerants and retardants.

The term "elastomeric polymer" indicates a natural or synthetic polymer which, after vulcanisation, can be stretched repeatedly at room temperature to at least twice its original length and after removal of the tensile load substantially immediately returns with force to approximately its original length (according to the definitions of the ASTM D1566-11 Standard terminology relating to Rubber).

The term "diene elastomeric polymer" indicates an elastomeric polymer derived from the polymerization of one or more monomers, of which at least one is a conjugated diene.

The term "reinforcing filler" or filler refers to a compound which incorporated in the elastomeric compound is able to improve the static and dynamic mechanical properties of the vulcanised elastomeric component.

The term "mixing step (i)" indicates the step of the preparation process of the elastomeric compound in which one or more additives can be incorporated by mixing and possibly heating, except for the vulcanising agent which is fed in step (ii). The mixing step (i) is also referred to as "non-productive step". In the preparation of a compound there may be several "non-productive" mixing steps which may be indicated with (ia), (ib), etc.

The term "mixing step (ii)" indicates the next step of the preparation process of the elastomeric compound in which the vulcanising agent and, possibly, the other additives of the vulcanisation package are introduced into the elastomeric compound obtained from step (i), and incorporated by mixing, at a controlled temperature lower than the vulcanisation temperature, generally at a mixing temperature lower than 120° C., so as to provide the vulcanisable elastomeric compound. The mixing step (ii) is also referred to as "productive step".

The term "high performance tyres", commonly referred to as "HP" and "UHP" ("High Performances" and "Ultra High Performances") means in particular, but not exclusively, those that for example belong to the "T", "U", "H", "V", "ZR", "W", "Y" classes according to the E.T.R.T.O. classification, suitable for maximum speeds over 190 km/h and up to over 300 Km/h, for which the operating performance at high temperatures is critical, and constitute one of the most important factors in their design and construction.

For the purposes of the present description and the following claims, the term "phr" (acronym for parts per hundreds of rubber) indicates the parts by weight of a given elastomeric compound component per 100 parts by weight of the elastomeric polymer, considered net of any plasticising extension oils.

Unless otherwise indicated, all the percentages are percentages by weight.

DETAILED DESCRIPTION OF THE INVENTION

Figure 1:
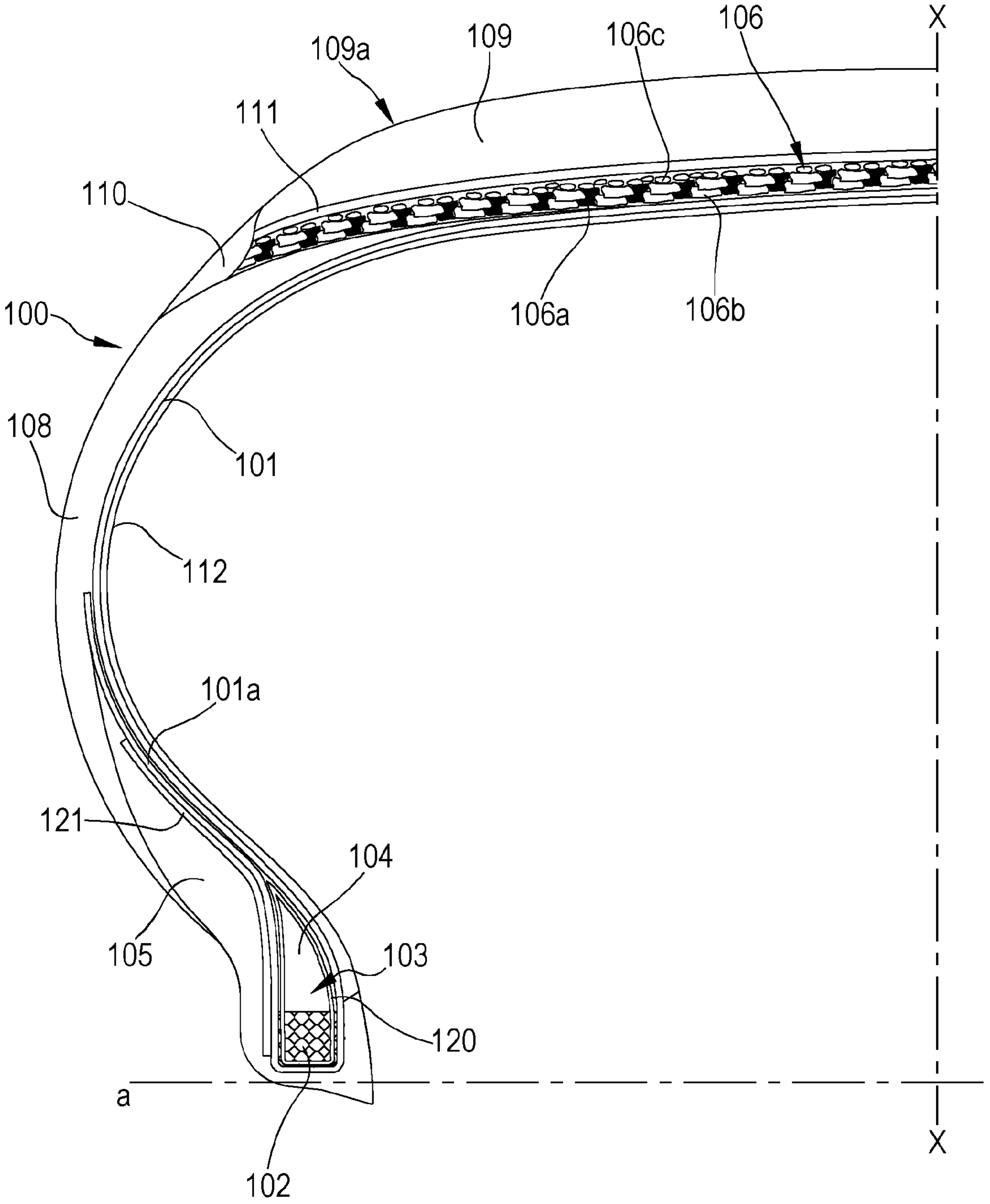
FIG. 1 schematically shows a semi-sectional view of a tyre for vehicle wheels according to the present invention.
Figure 2:
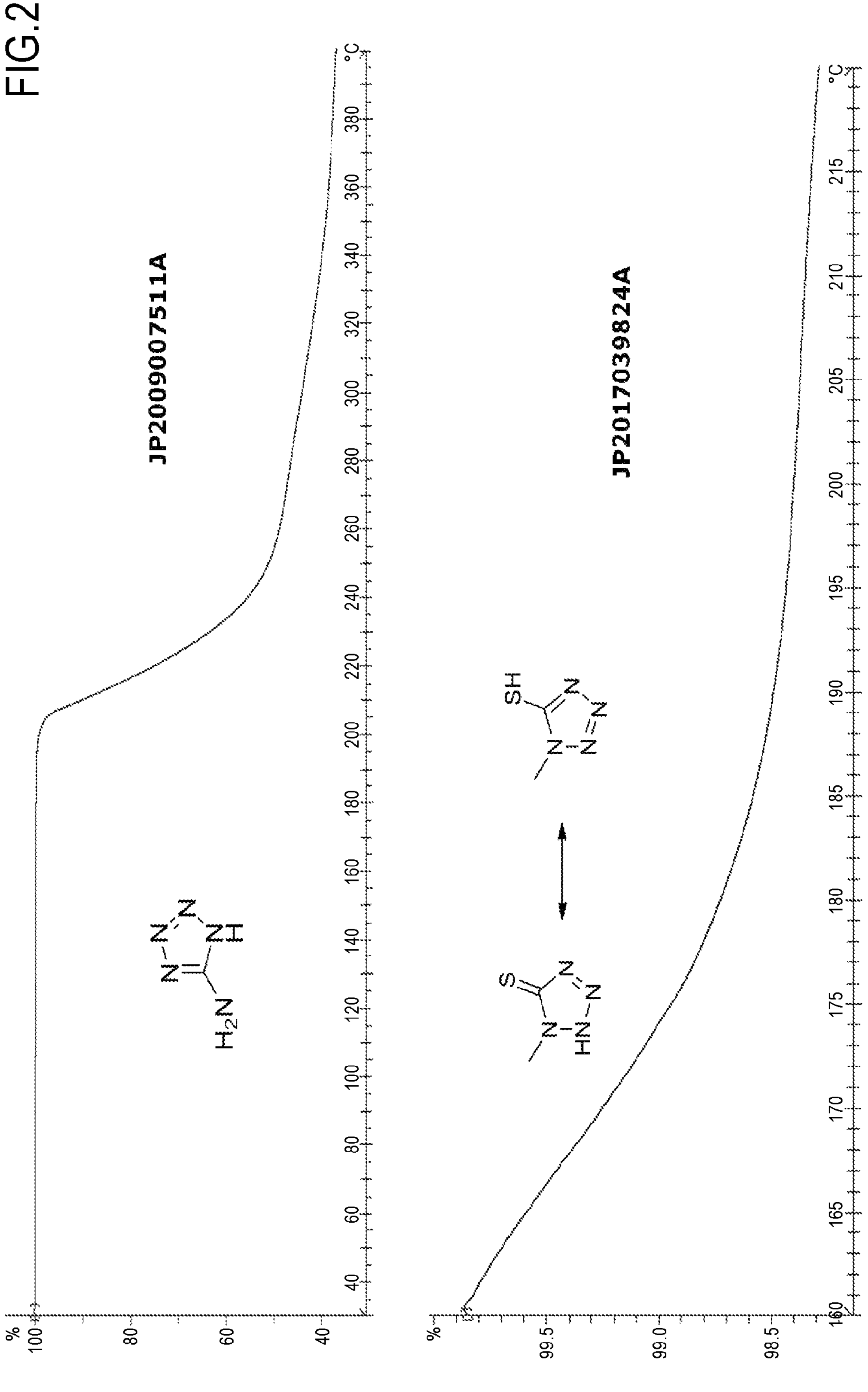
FIG. 2 shows the plots of the thermogravimetric analysis (TGA) of the tetrazoles described in the prior documents JP2009007511A and JP2017039824A.

The elastomeric composition for tyre compounds according to the present invention is characterized by one or more of the following preferred aspects taken alone or in combination with one another.

The elastomeric composition according to the invention comprises 100 phr of at least one diene elastomeric polymer.

The elastomeric composition according to the invention can comprise two or more diene elastomeric polymers in mixture for a total of 100 phr.

The diene elastomeric polymer may be selected from those commonly used in sulphur-vulcanisable elastomeric compositions, which are particularly suitable for producing tyres, i.e. from among solid elastomeric polymers or copolymers with an unsaturated chain having a glass transition temperature (Tg) generally lower than 20° C., preferably in the range from 0° C. to −110° C.

These polymers or copolymers may be of natural origin or may be obtained by solution polymerization, emulsion polymerization or gas-phase polymerization of one or more conjugated dienes, optionally mixed with at least one comonomer selected from monoolefins, monovinylarenes and/or polar comonomers in an amount not exceeding 60% by weight.

The conjugated dienes generally contain from 4 to 12, preferably from 4 to 8 carbon atoms and may be selected, for example, from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene and mixtures thereof. 1,3-butadiene and isoprene are particularly preferred.

The monoolefins can be selected from ethylene and α-olefins generally containing from 3 to 12 carbon atoms, such as for example propylene, 1-butene, 1-pentene, 1-hexene, 1-octene or mixtures thereof.

Monovinylarenes, which may optionally be used as comonomers, generally contain from 8 to 20, preferably from 8 to 12 carbon atoms and may be selected, for example, from: styrene; 1-vinylnaphthalene; 2-vinylnaphthalene; various alkyl, cycloalkyl, aryl, alkylaryl or arylalkyl derivatives of styrene, such as, for example, α-methylstyrene, 3-methylstyrene, 4-propylstyrene, 4-cyclohexylstyrene, 4-dodecylstyrene, 2-ethyl-4-benzylstyrene, 4-p-tolyl-styrene, 4-(4-phenylbutyl)styrene, and mixtures thereof. Styrene is particularly preferred.

Polar comonomers that may optionally be used, can be selected, for example, from: vinylpyridine, vinylquinoline, acrylic acid and alkylacrylic acid esters, acrylonitriles, or mixtures thereof, such as, for example, methyl acrylate, ethyl acrylate, methyl methacrylate, ethyl methacrylate, acrylonitrile and mixtures thereof.

Preferably, the diene elastomeric polymer may be selected, for example, from among: cis-1,4-polyisoprene (natural or synthetic, preferably natural rubber), 3,4-polyisoprene, polybutadiene (in particular polybutadiene with a high content of 1,4-cis), optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, and mixtures thereof.

The elastomeric composition may possibly comprise at least one polymer of one or more monoolefins with an olefinic comonomer or derivatives thereof. The monoolefins can be selected from: ethylene and α-olefins generally containing from 3 to 12 carbon atoms, such as for example propylene, 1-butene, 1-pentene, 1-hexene, 1-octene or mixtures thereof. The following are preferred: copolymers selected from ethylene and an α-olefin, optionally with a diene; isobutene homopolymers or copolymers thereof with small amounts of a diene, which are optionally at least partially halogenated. The diene possibly present generally contains from 4 to 20 carbon atoms and is preferably selected from: 1,3-butadiene, isoprene, 1,4-hexadiene, 1,4-cyclohexadiene, 5-ethylidene-2-norbornene, 5-methylene-2-norbornene, vinylnorbornene or mixtures thereof. Among them, the following are particularly preferred: ethylene/propylene (EPR) copolymers or ethylene/propylene/diene (EPDM) copolymers; polyisobutene; butyl rubber; halobutyl rubbers, in particular chlorobutyl or bromobutyl rubbers; and mixtures thereof.

The elastomeric composition for tyre according to the present invention comprises at least one reinforcing filler.

The present composition may comprise two or more reinforcing fillers in mixture.

The present composition may comprise at least 1.5 phr, 2 phr, 5 phr or at least 10 phr of at least one reinforcing filler or mixtures thereof.

The present composition can comprise from 1 phr to 150 phr, from 1 phr to 120 phr, from 5 phr to 120 phr or from 10 phr to 90 phr of at least one reinforcing filler or mixtures thereof.

Preferably, the reinforcing filler is selected from optionally modified carbon black, silica, silicates, lamellar or fibrous, chalk, talc, kaolin, bentonite, titanium dioxide, or mixtures thereof, preferably is selected from carbon black, silica, silicates or mixtures thereof.

In one embodiment, said reinforcing filler comprises carbon black.

Preferably, the carbon black is selected from those having a surface area not smaller than 20 $m^2/g$, preferably larger than 50 $m^2/g$ (as determined by STSA—statistical thickness surface area according to ISO 18852:2005).

The carbon black may be, for example, N234, N326, N330, N375 or N550, N660 marketed by Birla Group (India) or by Cabot Corporation.

The present mono-tetrazole compatibilizing agents can, once distributed in the elastomer, stably bind the carbon black and improve the hysteretic behaviour of the compound.

In one embodiment, said reinforcing filler comprises modified carbon black.

Carbon black can be modified for example by reaction with modifying reagents such as serinolpyrrole, as described for example in WO2016050887A1 or by oxidation (oxidised carbon black) as shown in application PCT/IB2019/060596.

In one embodiment, said reinforcing filler comprises a conventional silica, such as silica from sand precipitated with strong acids, preferably amorphous, or a silica from rice husk as described for example in WO2019229692A1.

Commercial examples of suitable silica are Zeosil 1165 MP, Zeosil 1115 MP, Zeosil 185 GR, Efficium from Solvay, Newsil HD90 and Newsil HD200 from Wuxi, K160 and K195 from Wilmar, H160AT and H180 AT from IQE, Zeopol 8755 and 8745 from Huber, Perkasil TF100 from Grace, Hi-Sil EZ 120 G, EZ 160G, EZ 200G from PPG, Ultrasil 7000 GR and Ultrasil 9100 OR from Evonik.

In one embodiment, said reinforcing filler comprises silica mixed with carbon black. In one embodiment, said reinforcing filler comprises a modified silica.

Silica can be modified for example by reaction with silsequioxanes (as in WO2018078480A1), by reaction with pyrroles (as in WO2016050887A1) or by reaction with silanising agents, such as bis(triethoxysilylpropyl)tetrasulphide (TESPT), 3-aminopropyltriethoxysilane (APTES) 3-glycidyloxypropyltriethoxysilane triethoxy(octyl)silane, triethoxy(ethyl)silane, triethoxy-3-(2-imidazolin-1-yl)propylsilane, triethoxy-p-tolylsilane, triethoxy(1-phenylethenyl)silane, triethoxy-2-thienylsilane, 1H,1H,2H,2H-perfluorooctyltriethoxysilane, 3-(triethoxysilyl)propyl isocyanate, 1H,1H,2H,2H-perfluorodecylthriethoxysilane, isobutyltriethoxysilane, n-octadecyltriethoxysilane, (3-chloropropyl) triethoxysilane, triethoxysilane and 3-(triethoxysilyl)propionitrile.

Commercial examples of suitable silanising agents are Si69, Dynasilan AMEO and Dynasilan GLYEO from Evonik.

The modified silica may be a sulphurised silanised silica.

Sulphurised silanised silica is a silica prepared by reaction of a silica, such as fumed silica, precipitated amorphous silica, wet silica (hydrated silicic acid), anhydrous silica (anhydrous silicic acid), or mixtures thereof, or of a metal silicate, such as aluminium silicate, sodium silicate, potassium silicate, lithium silicate or mixtures thereof, with at least one sulphurised silanising agent.

The term “sulphurised silanising agent” indicates an organic derivative of silicon containing mercapto, sulphide, disulphide or polysulphide groups, said derivative being capable of reacting with the OH groups of silica.

A commercial example of suitable sulphurised silanised silica is Agilon 400 silica from PPG.

In one embodiment, said reinforcing filler comprises a modified silica mixed with carbon black.

In one embodiment, said reinforcing filler comprises silicates.

In one embodiment, said silicates are silicate fibres. These fibres typically have nano dimensions and have needle-like morphology.

The silicate fibres are preferably selected from sepiolite fibres, paligorskite fibres (also known as attapulgite), wollastonite fibres, imogolite fibres and mixtures thereof.

In one embodiment, said reinforcing filler comprises silicate fibres mixed with carbon black.

In one embodiment, said silicate fibres are modified silicate fibres.

In one embodiment, the modified silicate fibres can be for example fibres modified by acid treatment with partial removal of magnesium, such as those described and exemplified in patent application WO2016/174629A1.

In one embodiment, the modified silicate fibres can be for example fibres modified by deposition of amorphous silica on the surface, such as those described and exemplified in patent application WO2016/174628A1.

In one embodiment, the modified silicate fibres can be fibres organically modified by reaction, for example, with quaternary ammonium salts such as sepiolite fibres modified by reaction with talloyl benzyl dimethyl ammonium chloride marketed by Tolsa under the name Pangel B5.

In one embodiment, the modified silicate fibres can be fibres modified by reaction with a silanising agent selected for example from mono or bifunctional silanes with one or two or three hydrolysable groups such as bis-(3-triethoxysilyl-propyl)disulphide (TESPD), bis(3-triethoxysilyl-propyl) tetrasulphide (TESPT), 3-thio-octanoyl-1-propyl-triethoxysilane (NXT), $Me_2Si(OEt)_2$, $Me_2PhSiCl$, $Ph_2SiCl_2$.

In one embodiment, said reinforcing filler comprises modified silicate fibres mixed with carbon black.

In one embodiment, said silicates are lamellar silicates, such as bentonites, alloysite, laponite, saponite, vermiculite or hydrotalcite.

In one embodiment, said silicates are modified lamellar silicates analogously to what has already been described for modified silicate fibres.

The elastomeric composition for tyre compounds of the invention comprises at least one monotetrazole compatibilizing agent of formula (I).

Preferably, the present elastomeric composition comprises at least 0.5 phr or at least 1 phr or at least 2 phr or at least 3 phr, more preferably at least 5 phr or at least 8 phr of at least one monotetrazole compatibilizing agent of formula (I).

The elastomeric composition for tyre compounds of the invention preferably comprises no more than 30 phr, more preferably no more than 20 phr, even more preferably no more than 10 phr of at least one monotetrazole compatibilizing agent of formula (I).

The elastomeric composition for tyre compounds of the invention preferably comprises from 0.5 phr to 30 phr, more preferably from 1 phr to 20 phr, even more preferably from 2 phr to 20 phr or from 2 phr to 10 phr of at least one monotetrazole compatibilizing agent of formula (I).

The elastomeric composition for tyre compounds of the invention can comprise two or more of said compatibilizing agents of formula (I) in a mixture, preferably in a total amount from 0.5 phr to 30 phr, more preferably from 1 phr to 20 phr, even more preferably from 2 phr to 10 phr.

In the present elastomeric composition, the monotetrazole compatibilizing agent of formula (I) is preferably used in an amount proportional to the reinforcing filler incorporated therein.

The elastomeric composition for tyre compounds of the invention comprises at least one monotetrazole compatibilizing agent of formula (I) and at least one reinforcing filler preferably in a weight ratio referred to the reinforcing filler comprised between 0.01:1 and 0.3:1, more preferably between 0.02:1 and 0.15:1.

Preferably, in the monotetrazole compatibilizing agent of formula (I)

(I)

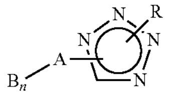

A is present and is an organic group (linker) at least divalent having the function of linking at least one group B to the tetrazole and possibly of modulating the physical properties and/or the activation temperature of the tetrazole.

The term “at least divalent organic group (linker)” means an organic group capable of covalently binding tetrazole and at least one group B.

The linker A for the present purposes must preferably be sufficiently stable under the normal conditions of processing, vulcanisation and use of the elastomeric compound.

Preferably, group A is divalent, i.e. it binds only one group B (n=1).

Group A is an organic group preferably selected from $C_1$-$C_{10}$ alkylene; $C_6$-$C_{10}$ arylene; mono or bicyclic, 5-, or 6-membered, saturated, unsaturated or aromatic, optionally benzocondensate heterocyclylene, comprising at least one heteroatom selected from N, S and O: $C_1$-$C_5$ alkylene-$C_6$-$C_{10}$ arylene-; $C_6$-$C_{10}$-arylene-$C_1$-$C_5$ alkylene; $C_1$-$C_5$ alkylene-$C_6$-$C_{10}$ arylene-$C_1$-$C_5$ alkylene; $C_1$-$C_5$ alkylene-heterocyclylene-; heterocyclylene-$C_1$-$C_5$ alkylene; $C_1$-$C_5$ alkylene-heterocyclylene-$C_1$-$C_5$ alkylene; $C_6$-$C_{10}$ arylene-$C_6$-$C_{10}$ arylene; heterocyclylene-heterocyclylene; $C_6$-$C_{10}$ arylene-$C_1$-$C_5$ alkylene-$C_6$-$C_{10}$ arylene; heterocyclylene-$C_1$-$C_5$ alkylene-heterocyclylene wherein said heterocyclylene is as defined above and said alkylene optionally comprises one or more heteroatoms selected from B, N, S, O, P and Si or functionalised groups selected from $—NR_3—CO—$, $—CO—NR_3—$, $—NH—CO—NH—$, $—COO—$, $—O—CO—$, $—CO—$, $—C{=}N(R_3)—$, $—CO—N(R_3)—CO—$, $—C{=}N(OH)—$, $—O—CO—N(R_3)—$, $—N(R3)$-

COO—, —SO—, —$SO_2$—, —$SO_2$—, —$SO_2O$—, —CS—, —CS—O—, —COS—, —CS—S—, wherein R3 represents hydrogen or $C_1$-$C_5$ alkyl.

Alkylene, arylene and heterocyclylene refer to an at least divalent radical obtained by removing at least one hydrogen atom from an alkyl, aryl and heterocyclic group, respectively.

The $C_1$-$C_5$ alkylene and the $C_1$-$C_{10}$ alkylene can be a hydrocarbon group, saturated or unsaturated, linear or branched, optionally comprising, in chain or linked to atoms of the chain, one or more heteroatoms selected from B, N, S, O, P and Si.

The alkylene may be for example —$CH_2$—, —CH<, —$(CH_2)_{2-10}$—. —$CH_2$—O—$CH_2$—, —O—$CH_2$—$CH_2$—; —(O—$CH_2$—CH—R)—. —$(CH_2)_3$—NH—C(O)—, —$(CH_2)_3$—NH—C(O)—NH—.

$C_6$-$C_{20}$ or $C_6$-$C_{10}$ arylene comprises carbocyclic, mono and polycyclic aromatic ring systems, in which the single carbocyclic rings are fused or attached to each other via a single bond.

$C_6$-$C_{20}$ or $C_6$-$C_{10}$ arylene may be for example phenylene, biphenylene, naphthylene, fluorenylene, phenanthrylene, para-alkoxy phenylene, meta-chloro phenylene.

Preferably, the arylene is phenylene.

Heterocyclylene includes heteroarylene as well as the dihydro and tetrahydro derivatives thereof. The binding sites of heterocyclylene may be a carbon atom or a heteroatom.

Heterocyclylene may be derived from a heterocycle such as pyrrole, dihydropyrrole, pyrrolidine, furan, dihydrofuran, tetrahydrofuran, benzofuran, isobenzofuran, dihydrobenzofuran, thiophene, dihydrothiophene, tetrahydrothiophene, benzothiophene, thiazolezole, dihydrothiazole, dihydrothiazole, benzotriazole, tetrazole, dihydrotetrazole, isothiazole, dihydroisothiazole, imidazole, benzoimidazole, dihydroimidazole, dihydrobenzoimidazole, oxazole, dihydrooxazole, benzoxazole, dihydrobenzoxazole, oxazoline, isoxazole, dihydroisooxazole, isoxazoline, oxadiazole, pyrazole, benzopyrazole, dihydropyrazole, pyridine, dihydropyridine, piperidine, piperazine, pyrazine, pyridazine γ-pyran, tetrahydropyran, dihydropyran, 1,4-dioxane, benzo-1,4-dioxane, morpholine, thiomorpholine pyrazine, dihydropyrazine, pyrazoline, quinoline, isoquinoline dihydroquinoline, tetrahydroisoidquinoline, indole, dihydroindoloindole, dihydroindole, quinazoline, quinoxaline and the like.

Preferably, heterocyclylene derives from a heterocycle selected from thiophene and pyrrole.

Alkylene, arylene and heterocyclylene may optionally be substituted by linear or branched $C_1$-$C_{10}$ alkylene groups, more preferably —$(CH_2)_{2-10}$ groups, oxo-alkylene-O—$C_1$-$C_{20}$ groups, amino-alkylene $N(C_1$-$C_{20})_2$, $C(O)C_1$-$C_{20}$ acyl groups or the corresponding esters and amides.

Preferably, the group A has a molecular weight lower than 1000 g/mol, more preferably lower than 500 g/mol, even more preferably lower than 300 g/mol.

In one embodiment, group A is absent and n equals 1.

In one embodiment, group A is present and represents a divalent organic group and n is equal to 1.

In the monotetrazole compatibilizing agent of formula (I) preferably R is $C_1$-$C_6$ alkyl, $C_6$-$C_{10}$ aryl, $C_1$-$C_5$-aryl $C_6$-$C_{10}$ alkyl, $C_6$-$C_{10}$ aryl-$C_1$-$C_5$ alkyl, $C_3$-$C_7$ cycloalkyl, heterocyclyle defined as group A heterocyclylene, i.e. mono or bicyclic, 5 or 6-membered rings, saturated, unsaturated or aromatic, optionally benzocondensed, heterocyclyle comprising at least one heteroatom selected from N, S and O.

R may be for example phenyl, 4-hydroxyphenyl, 4-carboxyphenyl, 3,5-dimethylphenyl, 3,5-dimethoxyphenyl, 4-octyloxyphenyl, 4-phenyl-1,2,4-triazolidine-3,5-dione, 1-hexyl, 2-thiophenyl, 5-amino-2-thiophenyl, diphenyl, pyrrolyl, oligo-2,5-thiophenyl with 1-4 thiophenes optionally substituted in position 3,4 by $C_1$-$C_{20}$ alkyl $C_1$-$C_{20}$ alkoxy, a benzofused polycyclic aromatic, such as naphthalene, fluorenyl or anthracene, optionally substituted by $C_1$-$C_{20}$ alkyl or $C_1$-$C_{20}$ alkoxy.

Preferably, R is selected from phenyl or thiophene.

R can be selected from the more lipophilic groups such as 4-hexyl-phenyl, naphthalenyl, fluorenyl and the like to increase the solubility of the monotetrazole compatibilizing agent (I) in the elastomeric matrix.

R can be a group B selected from those defined below. In this case, the present compatibilizing agent (I) can have a further group B capable of interacting with the same filler or, in the case of different groups B, with fillers of different nature such as silica and carbon black.

In one embodiment, R is different from B.

R can be selected to suitably modify the activation temperature Ta of the tetrazole.

The group R may be substituted by at least one electron withdrawing group X.

Generally, if R is substituted by an electron withdrawing group X, the tetrazole is more stable and Ta increases.

The electron withdrawing group X can be selected for example from halogen, substituted carbonyl (—CO-alkyl or —CO-aryl), carboxyl, ester, cyano, nitro, haloalkyl, sulphonyl ($SO_2$-alkyl or $SO_2$-aryl), trihalomethyl.

It is preferably selected from ester, cyano and haloalkyl.

It may be advantageous to select an electron withdrawing group X traceable with suitable analytical techniques, such as nuclear magnetic resonance, even when the monotetrazole compatibilizing agent (I) containing it is diluted in the elastomeric compound, such as for example a fluorinated group such as —$CF_3$.

The group R may be substituted by at least one electron-donor group Y. Generally, if R is substituted by an electron donor group Y, the tetrazole is less stable and the Ta decreases.

The electron donor group Y may for example be selected from hydroxy, $C_1$-$C_{10}$ alkoxy, benzyloxy, $C_1$-$C_{10}$ alkyl, amino, amino monosubstituted with $C_1$-$C_{10}$ alkyl, amino disubstituted with $C_1$-$C_{10}$ alkyl, primary amide (—NH—COR), hydrazonyl (CH═N—$NR_2$) and the like.

The monotetrazole compatibilizing agent of formula (I) can comprise more than one group with high affinity for the filler, in particular from 1 (for R different from B and n=1) to 4 groups (for R═B and n=3).

In one embodiment, the monotetrazole compatibilizing agent of formula (I) comprises only one group B (formula I, n equal to 1 and R different from B).

The group B with high affinity for the reinforcing filler is a group that can comprise one or more heteroatoms and/or have polar substituents, such as for example hydroxyls, amines, mercapto, amides, if the reinforcing filler is polar or in general affine for those substituents, such as silica.

The group B with high affinity for the reinforcing filler, in the case in which the reinforcing filler is lipophilic, such as for example carbon black, can be a lipophilic or not very polar group.

The group B with high affinity for the reinforcing filler is preferably selected from $C_1$-$C_5$-trialkoxysilyl, $(HO)_2B$—, mono or bicyclic 5- or 6-membered rings, saturated, unsaturated or aromatic, optionally benzocondensate, heterocyclyl comprising at least one heteroatom selected from N, S and O, said group B being optionally substituted.

The group B with high affinity for the reinforcing filler can be a group comprising silicon such as a silane substituted with $C_1$-$C_5$ alkoxyls, $C_1$-$C_5$ alkyls and/or $C_6$-$C_{10}$ aryls, or a boric acid derivative group, or an aromatic or heterocyclic polycyclic hydrocarbon group.

Examples of group B comprising silicon are triethoxysilylalkyl, triethoxysilylaryl, diethoxyalkylsilylalkyl, diethoxyalkylsilylaryl, ethoxydyalkylsilylalkyl, ethoxyalkylsilylaryl, silyatrylalkyl or silylaryl.

If said reinforcing filler comprises silica or possibly modified silicates or mixtures thereof, group B is preferably a group of formula —Si(OR1)$_3$ wherein R1, equal or different from each other, are $C_1$-$C_5$ alkyls, more preferably $C_2$-$C_3$ alkyls or a group of formula —B—(OH)$_2$.

If said reinforcing filler comprises carbon black, possibly modified or mixtures thereof, group B can be an aromatic polycyclic hydrocarbon, selected from naphthalene, phenanthrene, anthracene, pyrene, benzopyrene, fluorene and benzocondensed derivatives thereof, or a heterocyclic residue, for example derivative of the serinolpyrroles described in patent application WO2016050887A1. In the monotetrazole compatibilizing agent (I) there can be from 1 to 3 groups B or, in case the group R is equal to B, from 1 to 4 groups B as defined above.

Preferably, in the monotetrazole of formula (I) n is 1 or 2, more preferably n is 1. The multiple B groups, if present, can be equal to each other and interact with the same filler or different from each other, showing affinity for filler of different nature, such as silica and carbon black.

In one embodiment, the monotetrazole compatibilizing agent of formula (I) is an agent of formula (I-A)

(I-A)

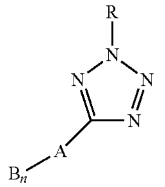

wherein B, A, R and n take on the meanings previously indicated for the agents of formula (I).

In one embodiment, the monotetrazole compatibilizing agent is an agent of formula (IA) wherein A is present and is a divalent organic group (linker), n is equal to 1 and R is different from B.

In one embodiment, the monotetrazole compatibilizing agent of formula (I) is an agent of formula (I-B)

(I-B)

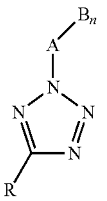

wherein A, B, R and n take on the meanings previously indicated for the agents of formula (I).

In one embodiment, the monotetrazole compatibilizing agent (I) is an agent of formula (I-A) or (I-B), wherein A is a divalent organic group (linker) of formula -A1-A2-wherein A1 can be absent or selected from $C_2$-$C_{10}$—NH—C(O)— alkylene, $C_2$-$C_{10}$—NH—C(O)—NH— alkylene, and wherein A2 can be absent or is selected from $C_6$-$C_{10}$ aryl and mono or bicyclic with 5 or 6-membered rings, saturated, unsaturated or aromatic, optionally benzocondensed, heterocyclyle, comprising at least one heteroatom selected from N, S and O.

In a preferred embodiment, the monotetrazole compatibilizing agent (I) is an agent of formula (I-A) or (I-B), wherein A is a divalent organic group (linker) of formula -A1-A2-wherein A1 can be absent or is selected from —$(CH_2)_{(2-4)}$—NH—C(O)— and —$(CH_2)_{(2-4)}$—NH—C(O)—NH—, and A2 can be absent or is selected from phenyl and thiophene; and/or R is selected among $C_4$-$C_6$ alkyl, benzyl, phenyl, thiophene, optionally substituted by at least one electron-withdrawing group X or electron donor group Y; and/or B is selected from naphthyl, pyrenyl, (HO)$_2$B— or —Si(OR1)$_3$ wherein R1 equal or different from each other are $C_1$-$C_3$ alkyl, and n is equal to 1.

Specific examples of agents of formula (IA) are the following:

(Ex. 3.1)

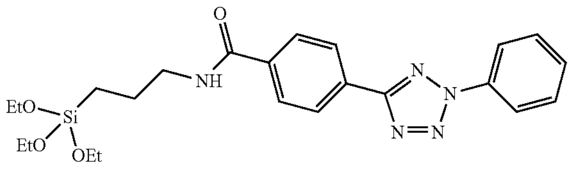

(Ex. 3.2)

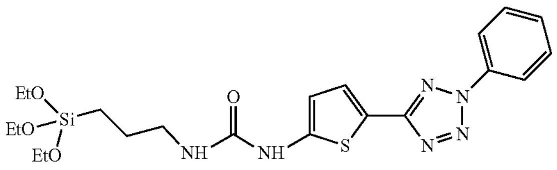

(Ex. 3.3)

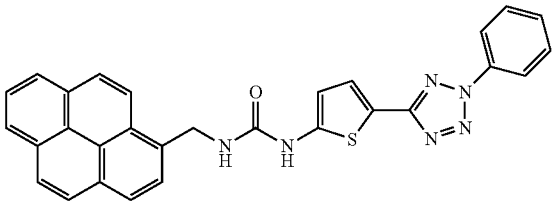

(Ex. 3.4)

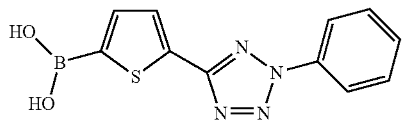

(Ex. 3.5)

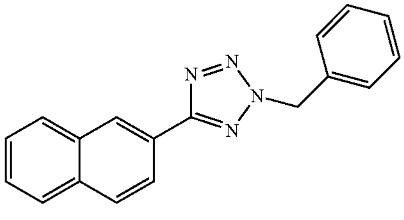

By appropriately selecting the organic group A, the group R, its possible at least one substituent electron-withdrawing group X or electron donor Y and group B, it is possible to modulate ad hoc the activation temperature Ta of the monotetrazole compatibilizing agent (I), its affinity for the specific reinforcing filler and its solubility in the selected elastomeric matrix.

Preferably the monotetrazole compatibilizing agent (I) has a molecular weight lower than 1500 g/mol, more preferably lower than 1000 g/mol, even more preferably lower than 600 g/mol.

Preferably the monotetrazole compatibilizing agent (I) has an activation temperature Ta not lower than 100° C., more preferably not lower than 120° C., even more preferably not lower than 140° C.

Depending on the activation temperature of the tetrazole, which can be modulated by suitably selecting the substituent R and possibly A, it is possible to carry out the reaction with the elastomer before, during or after the vulcanisation.

The monotetrazole compatibilizing agent (I) with an activation temperature Ta lower than 100° C. is not preferred since it could react with the elastomer right from the preliminary mixing steps of the components preceding the vulcanisation, even before reaching a homogeneous dispersion. The early reaction could lead to the concentration of the compatibiliser and therefore of the reinforcing filler in particular areas to the disadvantage of the performance of the material and also would lead to an increase in the viscosity of the green compound, making it not very processable in the subsequent extrusion and/or calendaring steps.

In one embodiment, the monotetrazole compatibilizing agent (I) preferably has an activation temperature Ta not higher than 220° C., more preferably not higher than 210° C., even more preferably not higher than 200° C. In one embodiment, the monotetrazole compatibilizing agent (I) has an activation temperature Ta between 140° C. and 220° C., preferably between 140° C. and 190° C., so as not to activate prematurely and react only when subjected to the conventional vulcanisation conditions (temperature indicatively from 140° C. to 180° C.).

In the case of elastomeric compounds comprising several reinforcing fillers of different nature, for example silica together with carbon black, it is possible to advantageously use in combination at least two compatibilizing agents of formula (I) having different groups B, with specific affinity for said different reinforcing fillers. The monotetrazole compatibilizing agent of formula (I) can be prepared according to one or more conventional synthesis schemes such as the following General Schemes 2 and 3 (exemplified herein for n=1):

Scheme 2

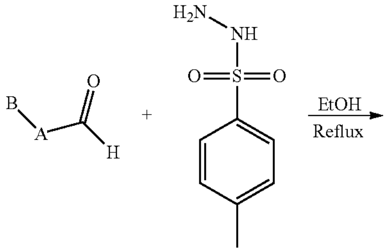

-continued

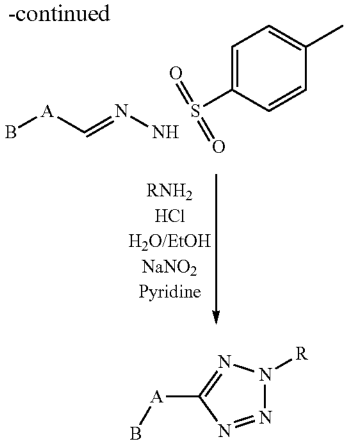

Scheme 3

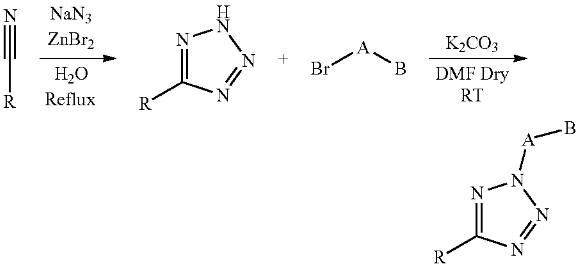

The elastomeric composition for tyre compounds according to the invention may comprise a vulcanising agent.

Preferably, the composition comprises at least 0.1 phr, at least 0.2 phr, at least 0.5 phr, at least 0.8 phr or at least 1 phr of at least one vulcanising agent.

Preferably, the composition comprises from 0.1 to 10 phr, from 0.2 to 10 phr, from 1 to 10 phr or from 1.5 to 5 phr of at least one vulcanising agent.

The at least one vulcanising agent is preferably selected from sulphur, or alternatively, sulphur-containing molecules (sulphur donors), such as, for example, bis[(trialkoxysilyl) propyl]polysulphides, thiurams, dithiodimorpholines and caprolactam-disulphide and mixtures thereof.

In one embodiment, the vulcanising agent is selected from the polytetrazole cross-linkers described in patent application IT102019000025804 in the name of the Applicant, of formula (II) R (II)

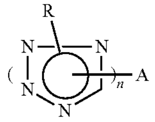

wherein

A represents an organic group (linker), possibly including one or more heteroatoms, covalently bound to n tetrazoles, equal or different from each other, where n is an integer from 2 to 10, and each of the n tetrazoles is bound to A in position 2 or 5 and is respectively substituted in position 5 or 2 with a R group selected, independently for each tetrazole, from $C_3$-$C_{10}$ linear or branched alkyl, $C_6$-$C_{20}$ aryl, $C_3$-$C_{10}$ cycloalkyl, mono or bicyclic, saturated, unsaturated or aromatic, with 5 or 6-member rings comprising at least one heteroatom selected from N, S, O, possibly benzocondensed heterocyclyle, being R in its turn possibly substituted with at least one electron withdrawing group X or one electron donor group Y, said polytetrazole cross-linking agent (C) having a molecular weight lower than 10000 g/mol.

Preferably, the vulcanising agent is sulphur, preferably selected from soluble sulphur (crystalline sulphur), insoluble sulphur (polymeric sulphur), (iii) oil-dispersed sulphur and mixtures thereof.

Commercial example of a vulcanising agent suitable for use in the elastomeric composition of the invention is the Redball Superfine sulphur of International sulphur Inc.

In the present elastomeric composition, the vulcanising agent may be used together with adjuvants such as vulcanisation activators, accelerants and/or retardants known to those skilled in the art.

The elastomeric composition according to the invention may optionally comprise at least one vulcanisation activator.

The vulcanisation activating agents suitable for use in the present elastomeric composition are zinc derivatives, in particular ZnO, $ZnCO_3$, zinc salts of saturated or unsaturated fatty acids containing from 8 to 18 carbon atoms, which are preferably formed in situ in the elastomeric composition by reaction of ZnO and of the fatty acid, as well as $Bi_2O_3$, PbO, $Pb_3O_4$, $PbO_2$, or mixtures thereof. For example, zinc stearate is used, preferably formed in situ in the elastomeric composition, by ZnO and fatty acid, or magnesium stearate, formed by MgO, or mixtures thereof. The vulcanisation activating agents may be present in the elastomeric composition of the invention in amounts preferably from 0.2 phr to 15 phr, more preferably from 1 phr to 5 phr.

Preferred activating agents derive from the reaction of zinc oxide and stearic acid. An example of activator is the product Aktiplast ST marketed by Rheinchemie.

The elastomeric composition according to the invention may further comprise at least one vulcanisation accelerant.

Vulcanisation accelerants that are commonly used may be for example selected from dithiocarbamates, guanidines, thioureas, thiazoles, sulphenamides, sulphenimides, thiurams, amines, xanthates, or mixtures thereof.

Preferably, the accelerant agent is selected from mercaptobenzothiazole (MBT), N-cyclohexyl-2-benzothiazol-sulphenamide (CBS), N-tert-butyl-2-benzothiazol-sulphenamide (TBBS) and mixtures thereof.

Commercial examples of accelerants suitable for use in the present elastomeric composition are N-cyclohexyl-2-benzothiazyl-sulphenamide Vulkacit® (CBS or CZ), and N-terbutyl 2-benzothiazyl sulphenamide, Vulkacit® NZ/EGC marketed by Lanxess.

Vulcanisation accelerants may be used in the present elastomeric composition in an amount preferably from 0.05 phr to 10 phr, preferably from 0.1 phr to 7 phr, more preferably from 0.5 phr to 5 phr.

The elastomeric composition according to the invention may optionally comprise at least one vulcanisation retardant agent.

The vulcanisation retardant agent suitable for use in the present elastomeric composition is preferably selected from urea, phthalic anhydride, N-nitrosodiphenylamine N-cyclohexylthiophthalimide (CTP or PVI) and mixtures thereof.

A commercial example of a suitable retardant agent is N-cyclohexylthiophthalimide VULKALENT G of Lanxess.

The vulcanisation retardant agent may be present in the present elastomeric composition in an amount of preferably from 0.05 phr to 2 phr.

The present elastomeric composition may comprise one or more vulcanisation retardant agents as defined above in a mixture.

The elastomeric composition according to the invention may optionally comprise at least 0.05 phr, preferably at least 0.1 phr or 0.5 phr, more preferably at least 1 phr or 2 phr of at least one silane coupling agent.

Preferably, the elastomeric composition according to the invention comprises from 0.1 phr to 20.0 phr or from 0.5 phr to 10.0 phr, even more preferably from 1.0 phr to 5.0 phr of at least one silane coupling agent.

Preferably, said coupling agent is a silane coupling agent selected from those having at least one hydrolysable silane group which can be identified, for example, by the following general formula (III):

$$(R')_3Si—C_nH_{2n}—X \tag{III}$$

wherein the groups R', equal or different from each other, are selected from: alkyl, alkoxy or aryloxy groups or from halogen atoms, provided that at least one of the groups R' is an alkoxy or an aryloxy group; n is an integer of from 1 to 6; X is a group selected from: nitrose, mercapto, amino, epoxide, vinyl, imide, chloro, $—(S)_mC_nH_{2n}—Si—(R')_3$ and —S—COR', wherein m and n are integers of from 1 to 6 and the groups R' are as defined above.

Particularly preferred silane coupling agents are bis(3-triethoxy-silyl-propyl)tetrasulphide and bis(3-triethoxysilyl-propyl)disulphide, also called polysulphide compatibilisers. Said coupling agents may be added as such or in mixture with an inert filler (such as carbon black) so as to facilitate their incorporation into the elastomeric composition.

An example of the silane coupling agent is TESPT: bis(3-triethoxysilylpropyl)tetrasulphide Si69 marketed by Evonik.

The elastomeric composition according to the invention may further comprise one or more additional ingredients, commonly used in the field, such as for example plasticising oils, resins, antioxidant and/or antiozonating agents (anti-aging agents), waxes, adhesives and the like.

For example, the elastomeric composition according to the present invention, in order to further improve the workability of the compound, may further comprise at least one plasticising oil.

The amount of plasticiser is preferably from 1 phr to 80 phr, preferably from 10 phr to 70 phr, more preferably from 30 phr to 50 phr.

The term "plasticising oil" means a process oil derived from petroleum or a mineral oil or a vegetable oil or a synthetic oil or combinations thereof.

The plasticising oil may be a process oil derived from petroleum selected from paraffin (saturated hydrocarbons), naphthenes, aromatic polycyclic and mixtures thereof.

Examples of suitable process oils derived from petroleum are aromatic, paraffinic, naphthenic oils such as MES (Mild Extract Solvated), DAE (Distillate Aromatic Extract), TDAE (Treated Distillate Aromatic Extract), TRAE (Treated Residual Aromatic Extract), RAE (Residual Aromatic Extract) known in the industry.

The plasticising oil may be an oil of natural or synthetic origin derived from the esterification of glycerol with fatty acids, comprising glycerine triglycerides, diglycerides, monoglycerides or mixtures thereof.

Examples of suitable vegetable oils are sunflower, soybean, linseed, rapeseed, castor and cotton oil.

The plasticising oil may be a synthetic oil selected from among the alkyl or aryl esters of phthalic acid or phosphoric acid.

The elastomeric composition according to the present invention may further comprise at least one resin.

The resin, if used in the composition, is a non-reactive resin, preferably selected from the group comprising hydrocarbon resins, phenolic resins, natural resins and mixtures thereof.

The amount of resin may be from 0 phr to 80 phr, preferably from 10 phr to 40 phr. The elastomeric composition according to the invention may optionally comprise at least one wax.

The wax may be for example a petroleum wax or a mixture of paraffin.

Commercial examples of suitable waxes are the Repsol N-paraffin mixture and the Antilux® 654 microcrystalline wax from Rhein Chemie.

The wax may be present in the elastomeric composition of the invention in an overall amount generally from 0.1 phr to 20 phr, preferably from 0.5 phr to 10 phr, more preferably from 1 phr to 5 phr.

The elastomeric composition according to the invention may optionally comprise at least one antioxidant agent.

The antioxidant agent is preferably selected from N-isopropyl-N'-phenyl-p-phenylenediamine (IPPD), N—(−1,3-dimethyl-butyl)-n'-phenyl-p-phenylenediamine (6PPD). N,N'-bis-(1,4-dimethyl-pentyl)-p-phenylenediamine (77PD), N,N'-bis-(1-ethyl-3-methyl-pentyl)-p-phenylenediamine (DOPD), N,N'-bis-(1,4-dimethyl-pentyl)-p-phenylenediamine, N,N'-diphenyl-p-phenylenediamine (DPPD), N,N'-ditolyl-p-phenylenediamine (DTPD), N,N'-di-beta-naphthyl-p-phenylenediamine (DNPD), N,N'-bis(1-methylheptyl)-p-phenylenediamine, N,N'-Di-sec-butyl-p-phenylenediamine (44PD), N-phenyl-N-cyclohexyl-p-phenylenediamine, N-phenyl-N'-1-methylheptyl-p-phenylenediamine and the like, and mixtures thereof, preferably it is N-1,3-dimethylbutyl-N-phenyl-p-phenylenediamine (6-PPD).

A commercial example of a suitable antioxidant agent is 6PPD from Solutia/Eastman or Santoflex produced by Flexsys.

The antioxidant agent may be present in the elastomeric composition in an overall amount preferably from 0.1 phr to 20 phr, preferably from 0.5 phr to 10 phr.

A further aspect of the present invention is an elastomeric compound for tyres obtained by mixing and vulcanising the elastomeric composition according to the invention.

The elastomeric compound according to the invention, when vulcanised, has dynamic properties comparable to and static properties better than similar compounds comprising conventional compatibilizing agents, as shown in the present experimental part.

A further aspect of the present invention is a process for preparing an elastomeric compound according to the invention.

The process for preparing the elastomeric compound according to the invention preferably comprises:

mixing, in one or more steps, all the components of the composition according to the invention keeping the temperature at a value T1 lower by at least 10° C. than the activation temperature Ta of the at least one monotetrazole compatibilizing agent (I), to give a compound (1) comprising said monotetrazole compatibilizing agent (I) with the tetrazole unreacted, and heating the compound (1) to a temperature T2 higher by at least 10° C. than the activation temperature Ta of the monotetrazole compatibilizing agent (I), to give a compound (2) wherein said at least one monotetrazole compatibilizing agent (I) has reacted at least partially by tetrazole decomposition and subsequent addition to the diene elastomeric polymer, and optionally vulcanising the compound.

During the first mixing step at temperature T1, the reinforcing filler and the monotetrazole compatibilizing agent (I) are dispersed in the elastomeric matrix. Under these conditions, the tetrazole ring of the compatibilizing agent of formula (I) generally remains substantially stable and does not undergo significant decomposition, while typically the one or more B groups of the compatibilizing agent of formula (I) react or interact with the filler.

In the subsequent heating step at temperature T2, a step which preferably coincides with the vulcanisation step of the tyre, the tetrazole ring of the compatibilizing agent (I) decomposes and reacts with the elastomer anchoring the filler to the matrix. Depending on the activation temperature Ta of the monotetrazole compatibilizing agent (I), which can be modulated by suitably selecting the substituent R and possibly A, and on the vulcanisation temperature, different process variants can be carried out and the reaction with the elastomer can take place before, during or after vulcanisation.

In one embodiment, the process preferably comprises heating the compound (1) to a temperature T2 equal to or higher than the activation temperature Ta of the monotetrazole compatibilizing agent (I), during the tyre vulcanisation step, to give the vulcanised compound (2). This step may be carried out in a conventional vulcanisation mould. In this embodiment, the monotetrazole compatibilizing agent (I) is selected so as to have a Ta similar to the temperature applied in vulcanisation, for example around 160° C.

In this embodiment, it is possible to proceed to the mixing steps preceding the vulcanisation without having to strictly control the temperature, for example by operating below the T of 160° C. and then fixing the fillers well dispersed in the matrix only subsequently, for example during vulcanisation.

In another embodiment, in which the activation temperature Ta of the monotetrazole compatibilizing agent (I) is lower than the vulcanisation T, it is possible to deliberately make the monotetrazole compatibilizing agent (I) react prematurely, in case it is desired to increase the viscosity of the material before vulcanisation, e.g. in the preparation of the liner or underliner.

In another embodiment, in which the activation temperature Ta of the monotetrazole compatibilizing agent (I) is higher than the vulcanisation T, the vulcanisation of the compound (1) is carried out but not the activation of the monotetrazole compatibilizing agent (I), to give a vulcanised compound comprising the unreacted monotetrazole compatibilizing agent (I).

This compound suitably incorporated in tyre components, for example in the sidewall insert, may undergo consolidation when the temperature of the tyre in use reaches the activation temperature Ta of the monotetrazole compatibilizing agent (I), to give the compound (2) stiffened by the anchoring of the agent and the filler. In this application, the elastomeric composition preferably also comprises a compatibilizing agent of the conventional silane type.

In another embodiment, by incorporating in the elastomeric compound at least two compatibilizing agents of formula (I) having different Ta, it is possible to activate one in the vulcanisation step and the other only subsequently when in the operating conditions the temperature in the tyre reaches the higher Ta of the second agent. Other process variants may relate to the use of compatibilizing agents of formula (I) having different Ta and affinities for different fillers.

By appropriately selecting the substituents R and B of said compatibilizing agents (I), the man skilled in the art can plan in which production or use step of the tyre to anchor one or the other filler with possible process and performance advantages in the tyre.

The present elastomeric compound may be prepared according to a process which typically comprises one or more mixing steps in at least one suitable mixer, in particular at least one mixing step (i) (non-productive) and a mixing step (ii) (productive) as defined above.

Each mixing step may comprise several intermediate processing steps or sub-steps, characterised by the momentary interruption of the mixing to allow the addition of one or more ingredients but generally without intermediate discharge of the compound.

The mixing may be carried out, for example, using an open mixer of the “open-mill” type or an internal mixer of the type with tangential rotors (Banbury®) or with interpenetrating rotors (Intermix), or in continuous mixers of the Ko-Kneader™ type (Buss®) or of the twin-screw or multi-screw type.

The temperatures during the mixing steps and sub-steps can also be set as a function of the activation temperature Ta of the monotetrazole compatibilizing agent (i) and of the process step in which activation is desired.

As previously discussed, the elastomeric composition preferably comprises, in addition to the monotetrazole compatibilizing agent (I), also a vulcanising agent.

The monotetrazole compatibilizing agent (I) can be incorporated in one or more of the steps (i) or (ii) while typically the vulcanising agent only in the production step (ii).

Typically, after one or more thermomechanical processing steps, the vulcanising agent is incorporated in the materials, preferably together with vulcanisation accelerants and/or retardants. In the final treatment step, productive step (ii), the temperature is generally kept below 120° C. and preferably below 100° C., so as to prevent any undesired pre-vulcanisation phenomena. Thereafter, the vulcanisable compound is incorporated in one or more components of the tyre and subjected to vulcanisation, according to known techniques.

Depending on the desired application, the vulcanised compound can comprise the unreacted monotetrazole compatibilizing agent (i) or, after decomposition of the tetrazole ring, already bound to the elastomer.

A further aspect of the present invention is a tyre component for vehicle wheels comprising, or preferably consisting of, an elastomeric compound according to the invention, preferably selected from the tread band, under-layer, anti-abrasive layer, sidewall, sidewall insert, mini-sidewall, liner, under-liner, rubber layers, bead filler, bead reinforcement layers (flipper), bead protection layers (chafer), sheet, preferably it is selected from tread, under-layer, rubber layers and sidewall insert. The tyre component may comprise or preferably may consist of a non-vulcanised elastomeric compound according to the invention (green component) or a vulcanised elastomeric compound according to the invention.

A further aspect of the present invention is a tyre for vehicle wheels comprising at least one component of a tyre according to the invention.

The tyre for vehicle wheels of the invention may comprise at least one tyre component which consists of an elastomeric compound according to the invention not vulcanised (green tyre) or which consists of an elastomeric compound according to the invention vulcanised (vulcanised tyre).

Preferably, said component is selected from among tread, under-layer, rubber layers and sidewall insert.

In one embodiment, a tyre for vehicles according to the present invention comprises at least a carcass structure comprising at least a carcass ply having opposite lateral edges associated to respective bead structure;

possibly a pair of sidewalls, each optionally comprising a sidewall insert, applied to the lateral surfaces of the carcass structure, respectively, in an axially outer position;

possibly a belt structure applied in radially outer position with respect to the carcass structure;

a tread band applied in a radially outer position to said carcass structure or, if present, a belt structure, possibly a layer of elastomeric material, referred to as under-layer, applied in a radially inner position with respect to said tread band, wherein at least one component, preferably the tread band or the rubber coating of the at least one carcass layer or the sidewall insert comprises, or preferably consists of, the elastomeric compound according to the invention.

In one embodiment, the tyre according to the invention is a car tyre, preferably a high-performance car tyre.

In one embodiment, the tyre according to the invention is a tyre for motorcycles, wherein at least one component comprises, or preferably consists of, the elastomeric compound according to the invention.

In a preferred embodiment, the tyre according to the invention is a tyre for motorcycle wheels, preferably for sports or racing motorcycles.

The tyre according to the invention may be a tyre for two, three or four-wheeled vehicles.

The tyre according to the invention can be for summer or winter use or for all seasons.

In one embodiment, the tyre according to the invention is a tyre for bicycle wheels. A tyre for bicycle wheels typically comprises a carcass structure turned around a pair of bead cores at the beads and a tread band arranged in a radially outer position with respect to the carcass structure. Preferably, at least the tread band and/or a rubber layer comprises the elastomeric compound according to the invention.

The tyre according to the present invention can be produced according to a process which comprises:

building components of a green tyre on at least one forming drum;

shaping, moulding and vulcanising the tyre;

wherein building at least one of the components of a green tyre comprises:

manufacturing at least one green component comprising, or preferably consisting of, the vulcanisable elastomeric compound of the invention.

DESCRIPTION OF A TYRE ACCORDING TO THE INVENTION

A tyre for vehicle wheels according to the invention, comprising at least one component comprising the present elastomeric compound, is illustrated in radial half-section in FIG. 1.

In FIG. 1, "a" indicates an axial direction and "X" indicates a radial direction, in particular X-X indicates the outline of the equatorial plane. For simplicity, FIG. 1 shows only a portion of the tyre, the remaining portion not shown being identical and arranged symmetrically with respect to the equatorial plane "X-X".

The tyre (100) for four-wheeled vehicles comprises at least one carcass structure, comprising at least one carcass layer (101) having respectively opposite end flaps engaged with respective annular anchoring structures (102), referred to as bead cores, possibly associated to a bead filler (104).

The tyre area comprising the bead core (102) and the filler (104) forms a bead structure (103) intended for anchoring the tyre onto a corresponding mounting rim, not shown.

The carcass structure is usually of radial type, i.e. the reinforcing elements of the at least one carcass layer (101) lie on planes comprising the rotational axis of the tyre and substantially perpendicular to the equatorial plane of the tyre. Said reinforcing elements generally consist of textile cords. Each bead structure is associated to the carcass structure by folding back of the opposite lateral edges of the at least one carcass layer (101) around the annular anchoring structure (102) so as to form the so-called carcass flaps (101*a*) as shown in FIG. 1.

In one embodiment, the coupling between the carcass structure and the bead structure can be provided by a second carcass layer (not shown in FIG. 1) applied in an axially outer position with respect to the first carcass layer.

An anti-abrasive strip (105) possibly made with elastomeric material is arranged in an outer position of each bead structure (103).

The carcass structure is associated to a belt structure (106) comprising one or more belt layers (106*a*), (106*b*) placed in radial superposition with respect to one another and with respect to the carcass layer, having typically textile and/or metallic reinforcing cords incorporated within a layer of elastomeric material.

Such reinforcing cords may have crossed orientation with respect to a direction of circumferential development of the tyre (100). By "circumferential" direction it is meant a direction generally facing in the direction of rotation of the tyre.

At least one zero-degree reinforcement layer (106*c*), commonly known as a "0° belt", may be applied in a radially outermost position to the belt layers (106*a*), (106*b*), which generally incorporates a plurality of elongated reinforcing elements, typically metallic or textile cords, oriented in a substantially circumferential direction, thus forming an angle of a few degrees (such as an angle of between about 0° and 6°) with respect to a direction parallel to the equatorial plane of the tyre, and coated with an elastomeric material.

A tread band (109) comprising the elastomeric compound according to the invention is applied in a position radially outer to the belt structure (106).

Moreover, respective sidewalls (108) of elastomeric material are applied in an axially outer position on the lateral surfaces of the carcass structure, each extending from one of the lateral edges of tread (109) at the respective bead structure (103).

In a radially outer position, the tread band (109) has a rolling surface (109*a*) intended to come in contact with the ground. Circumferential grooves, which are connected by transverse notches (not shown in FIG. 1) so as to define a plurality of blocks of various shapes and sizes distributed over the rolling surface (109*a*), are generally made on this surface (109*a*), which for simplicity is represented smooth in FIG. 1. An under-layer (111) comprising the elastomeric compound according to the invention can be arranged between the belt structure (106) and the tread band (109).

A strip consisting of elastomeric material (110), commonly known as "mini-sidewall", can optionally be provided in the connecting zone between the sidewalls (108) and the tread band (109), this mini-sidewall being generally obtained by co-extrusion with the tread band (109) and allowing an improvement of the mechanical interaction between the tread band (109) and the sidewalls (108). Preferably, the end portion of the sidewall (108) directly covers the lateral edge of the tread band (109).

In the case of tubeless tyres, a rubber layer (112), generally known as "liner", which provides the necessary impermeability to the inflation air of the tyre, can also be provided in a radially inner position with respect to the carcass layer (101).

The rigidity of the tyre sidewall (108) can be improved by providing the bead structure (103) with a reinforcing layer (120) generally known as flipper or additional strip-like insert.

The flipper (120) is a reinforcing layer which is wound around the respective bead core (102) and the bead filler (104) so as to at least partially surround them, said reinforcing layer being arranged between the at least one carcass layer (101) and the bead structure (103). Usually, the flipper is in contact with said at least one carcass layer (101) and said bead structure (103).

The flipper (120) typically comprises a plurality of textile cords incorporated within a layer of elastomeric material.

The reinforcing annular structure or bead (103) of the tyre may comprise a further protective layer which is generally known by the term of "chafer" (121) or protective strip and which has the function of increasing the rigidity and integrity of the bead structure (103).

The chafer (121) usually comprises a plurality of cords incorporated within a rubber layer of elastomeric material. Such cords are generally made of textile materials (such as aramid or rayon) or metal materials (such as steel cords).

A layer or sheet of elastomeric material can be arranged between the belt structure and the carcass structure. The layer can have a uniform thickness. Alternatively, the layer may have a variable thickness in the axial direction. For example, the layer may have a greater thickness close to its axially outer edges with respect to the central (crown) zone.

Advantageously, the layer or sheet can extend on a surface substantially corresponding to the extension surface of said belt structure.

In a preferred embodiment, a layer of elastomeric material, referred to as under-layer, can be placed between said belt structure and said tread band, said under-layer preferably extending on a surface substantially corresponding to the extension surface of said belt structure.

The elastomeric compound according to the present invention may be advantageously incorporated into one or more of the tyre components mentioned above, preferably in the tread band, in the sidewall insert, in the sheets and in the rubber compounds.

According to an embodiment not shown, the tyre may be a tyre for motorcycle wheels which is typically a tyre that has a straight section featuring a high tread camber.

The building of the tyre (100) as described above, can be carried out by assembling respective semi-finished products adapted to form the components of the tyre, on a forming drum, not shown, by at least one assembling device.

At least a part of the components intended to form the carcass structure of the tyre can be built and/or assembled on the forming drum. More particularly, the forming drum is intended to first receive the possible liner, and then the carcass structure. Thereafter, devices non shown coaxially engage one of the annular anchoring structures around each of the end flaps, position an outer sleeve comprising the belt structure and the tread band in a coaxially centred position around the cylindrical carcass sleeve and shape the carcass sleeve according to a toroidal configuration through a radial expansion of the carcass structure, so as to cause the application thereof against a radially inner surface of the outer sleeve.

After the building of the green tyre, a moulding and vulcanisation treatment is generally carried out in order to determine the structural stabilisation of the tyre through vulcanisation of the elastomeric compositions, as well as to impart a desired tread pattern on the tread band and at any distinguishing graphic signs at the sidewalls.

EXPERIMENTAL PART

Methods of Analysis

Thermogravimetric Analysis (TGA)

Figure 7A:
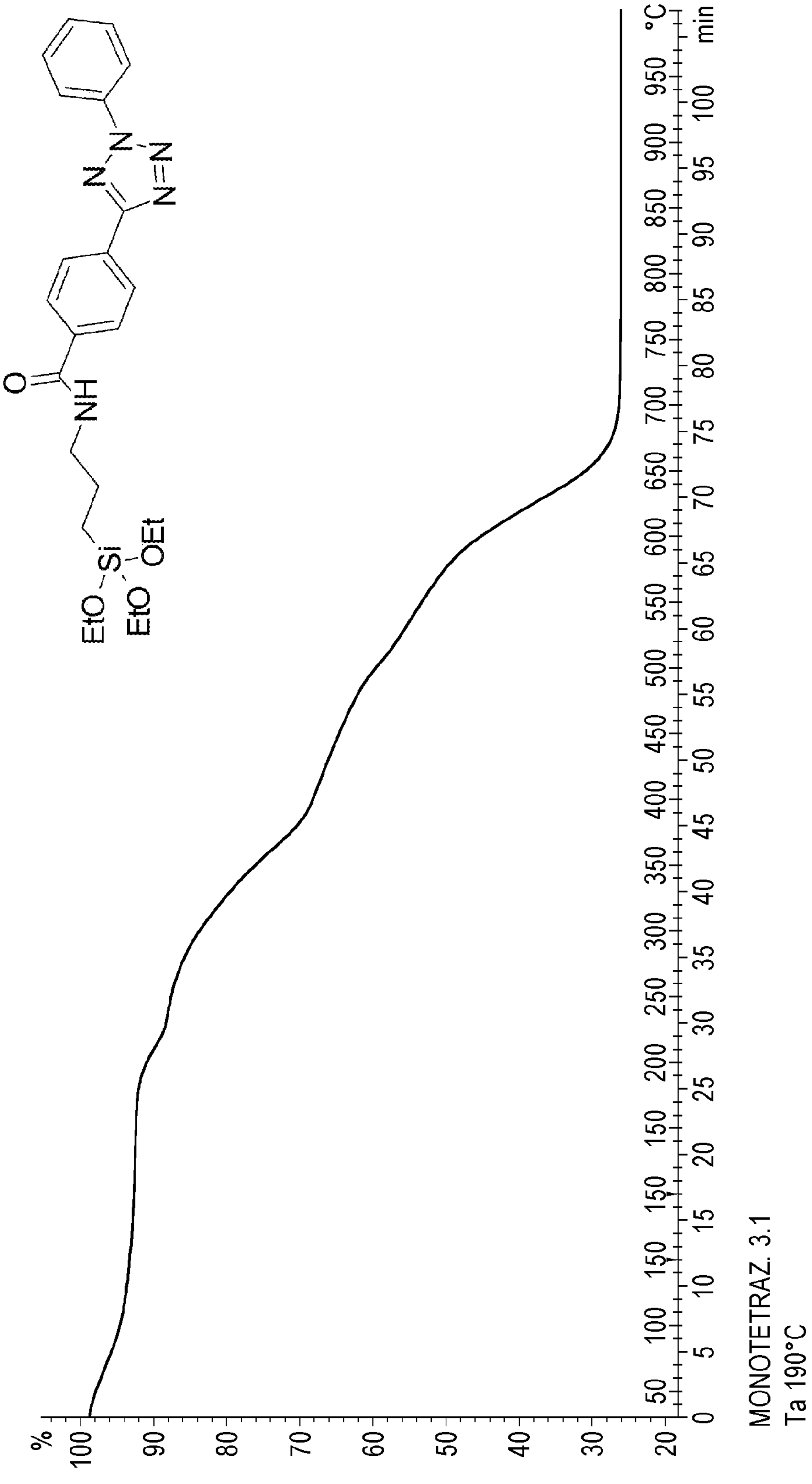
FIG. 7 (7A-7E) shows the plots of the thermogravimetric analysis (TGA) of the monotetrazole compatibilizing agents 3.1-3.5.
Figure 7B:
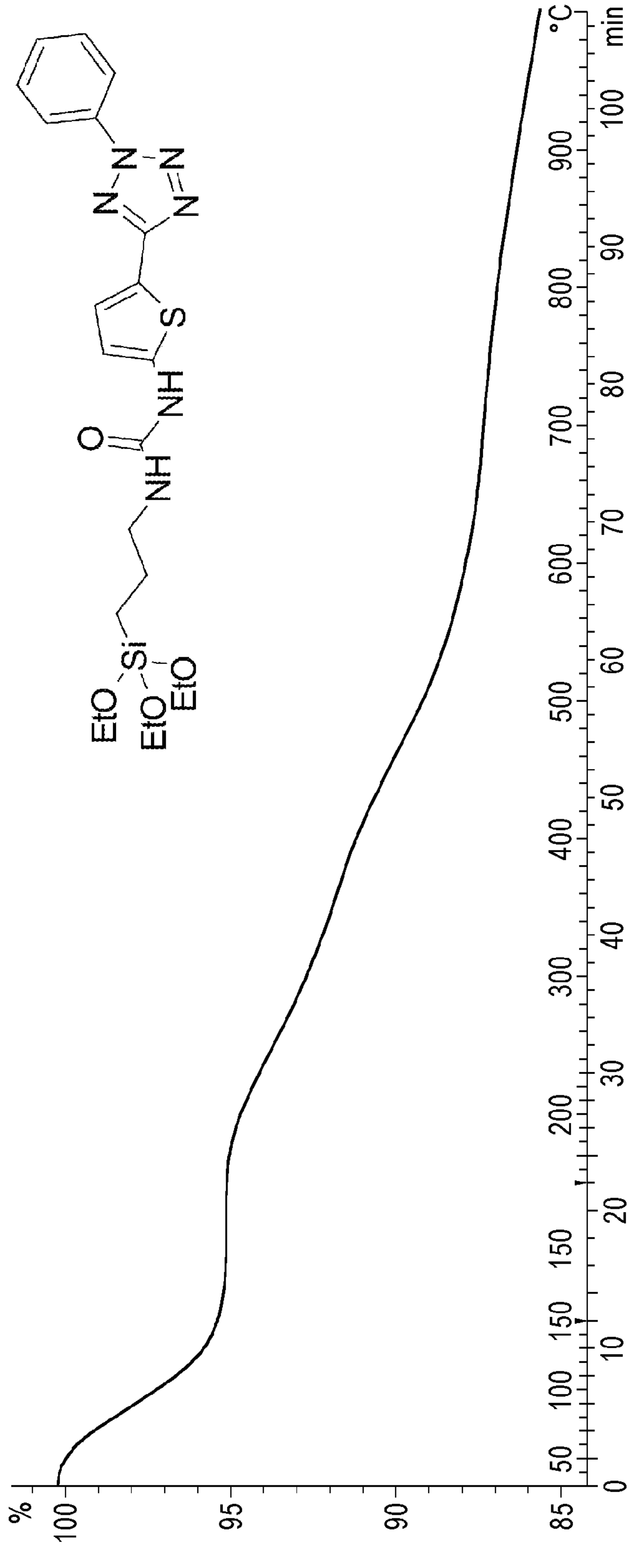
Figure 7C:
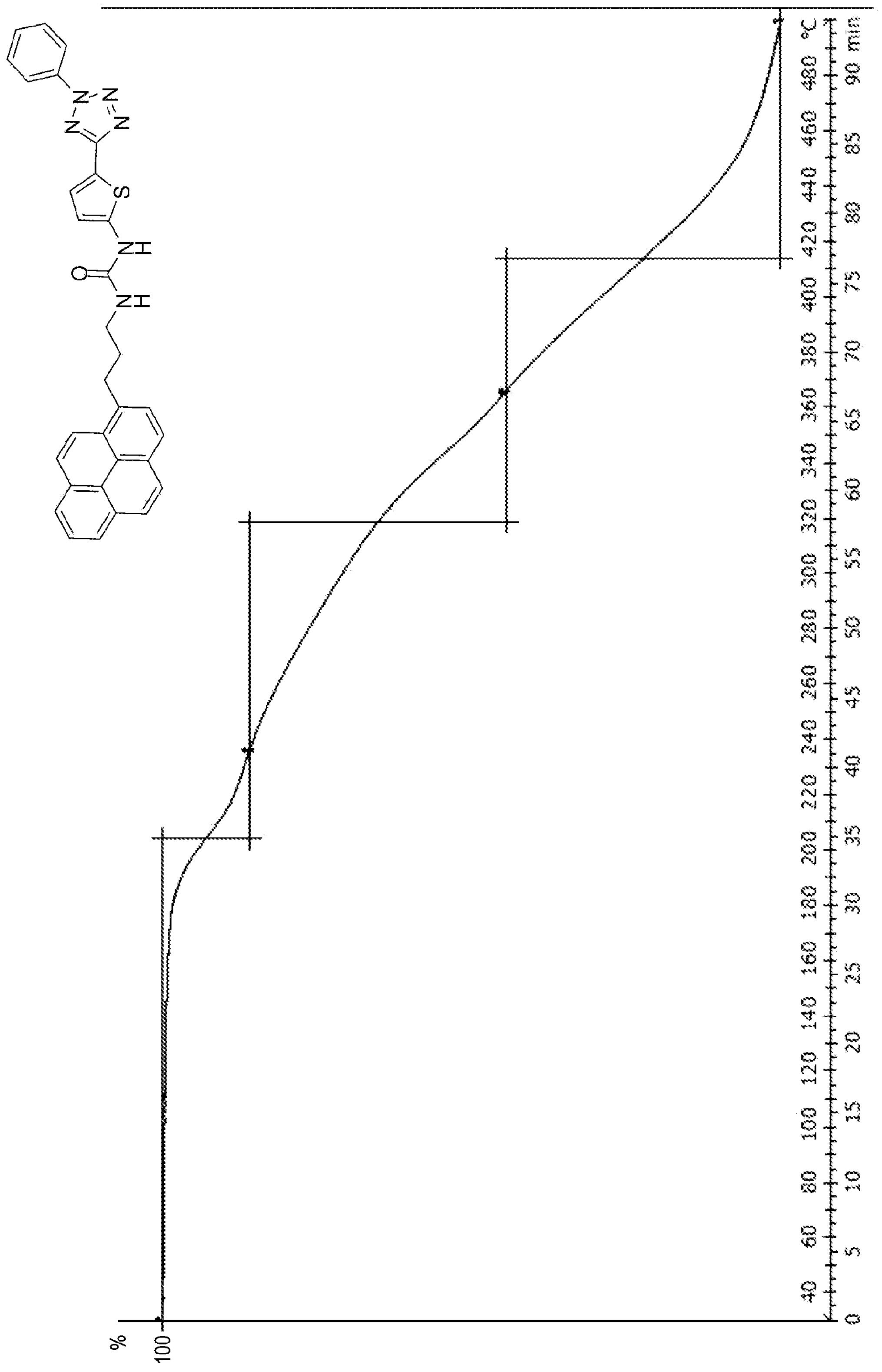
Figure 7D:
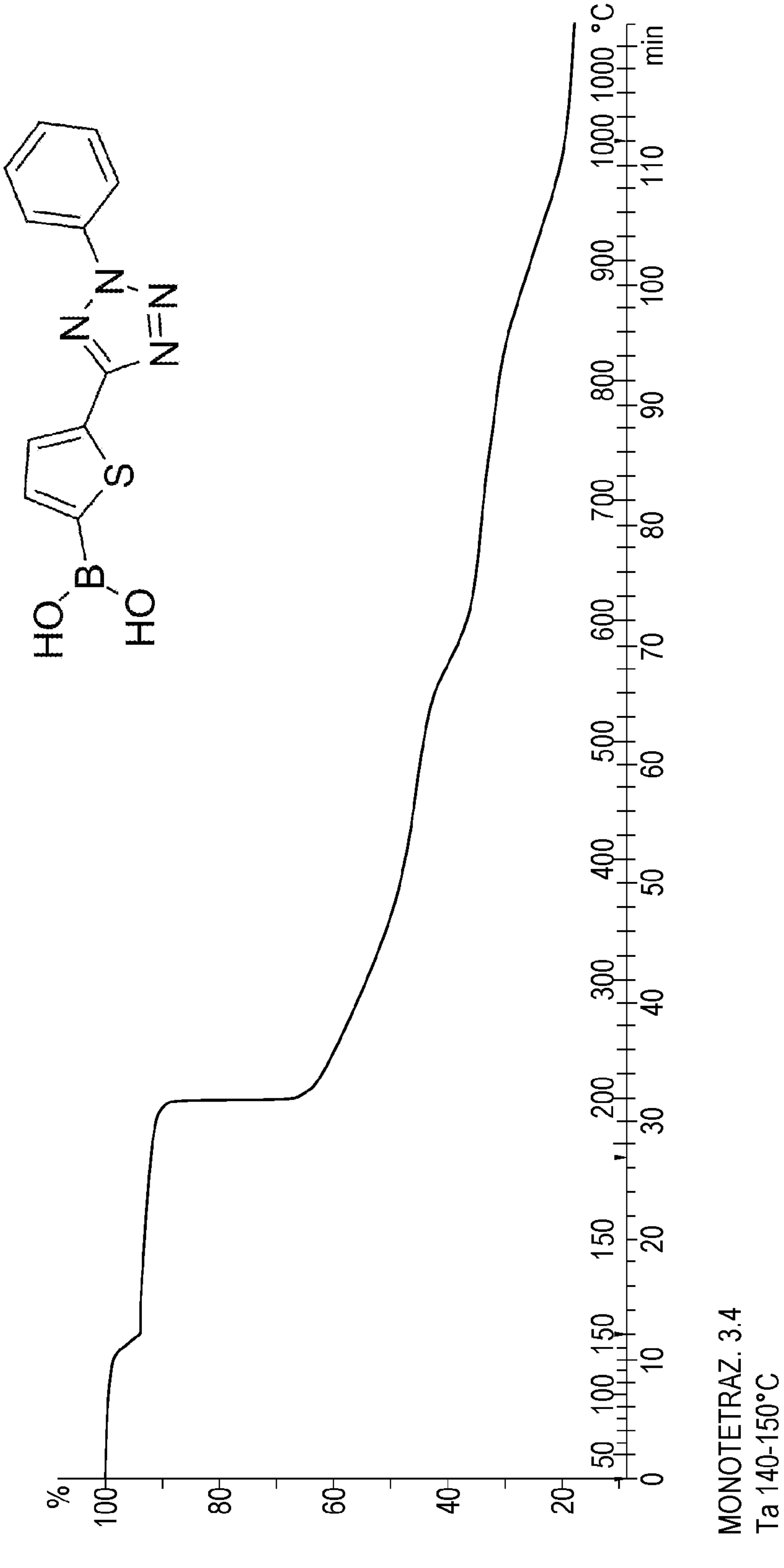
Figure 7E:
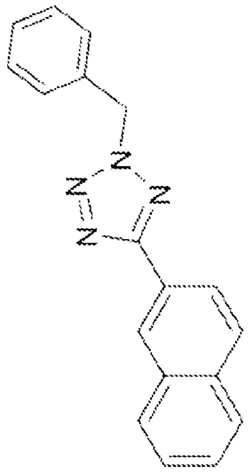
Figure 7E:
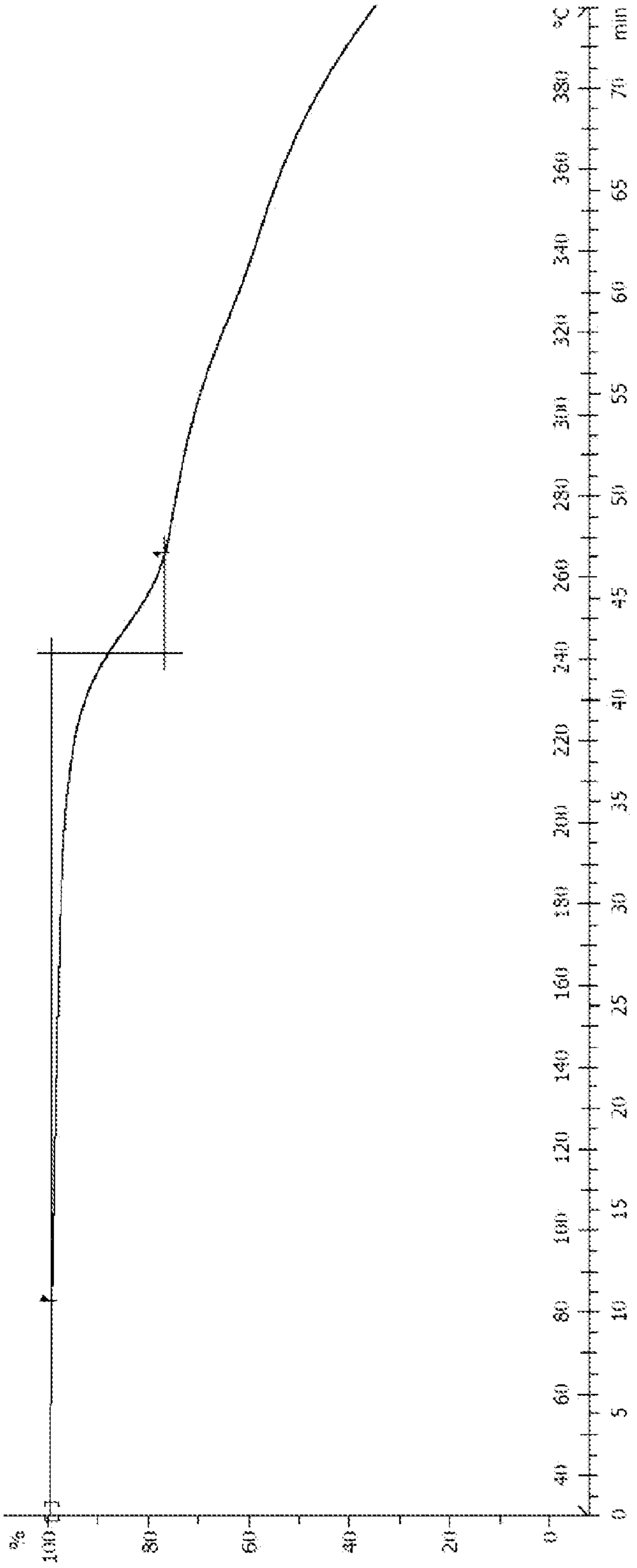

The thermal behaviour of the 2,5-disubstituted tetrazoles described herein was studied, in particular their activation temperature Ta was determined by thermogravimetric analysis, with a Mettler Toledo STARe system model, under the following conditions:

method 1) about 5 mg of pure monotetrazole agent were placed in the TGA crucible, using a thermal program from 30° C. to 500° C. with a ramp of 5°/min under flow of $N_2$ (see FIGS. 7C, 7E);

method 2) about 10 mg of pure monotetrazole agent were placed in the TGA crucible, using a thermal program from 30° C. to 1000° C., with heating ramp from 30 to 150° C. 10° C./min, constant temperature 150° C. for 10 min, heating from 150° C. to 1000° C. 10° C./min, under nitrogen flow (see FIGS. 7A, 7B, 7D).

The first weight loss step coincided, as a rule, with the loss of one molecule of nitrogen from tetrazole. The temperature at which the release of nitrogen from the tetrazole began was considered the activation temperature Ta.

Again by heating in a thermogravimeter, the reactivity of the monotetrazoles with reactive double bonds was evaluated under the following conditions: about 1 mg of monotetrazole compatibilizing agent (I) (or of the selected comparative agent) was dispersed in about 10 mg of butadiene oligomer Polyvest 130 and the mixture placed in the TGA crucible using a thermal program from 30° C. to 140° C. (10° C./min ramp), followed by isotherm at 140° C. for 30 min, cooling to 30° C. (ramp −10° C./min), heating from 30° C. to 90° C. (5° C./min), cooling to 30° C., heating to 170° C. (5° C./min) and isotherm of 30' at 170° C. This method simulated the thermal history of an elastomeric compound.

NMR

The NMR spectra were acquired with a Bruker 400 instrument. The samples were prepared by dissolving 5-10 mg of monotetrazole in 0.6 ml of deuterated solvent (Chloroform or DMSO).

IR

The IR spectra were acquired with a Perkin-Elmer spectrum 100 (FT-IR) instrument. The sample was loaded directly onto the crystal and pressed with a metal tip. The spectrum was recorded in ATR (Attenuate Total Reflectance) mode Measurement of Dynamic and Mechanical Rheological Properties of Elastomeric Compounds (RPA)

The rheological properties were evaluated using a Monsanto R.P.A. 2000 rheometer according to the following method: cylindrical test samples with weight from 4.5 g to 5.5 g were prepared by punching the first-step elastomeric compounds—compounds containing the reinforcing filler and the monotetrazole compatibilizing agent (I) but free of vulcanisers and co-vulcanisers, and of final green compounds (comprising all components including vulcaniser and co-vulcanisers).

The samples of the first and final step green compounds were heated in the rheometer at 190° C. for 30'.

The tests were performed at an oscillation frequency of 1.66 Hz (100 oscillations per minute) and an oscillation amplitude of ±0.5.

Figure 8:
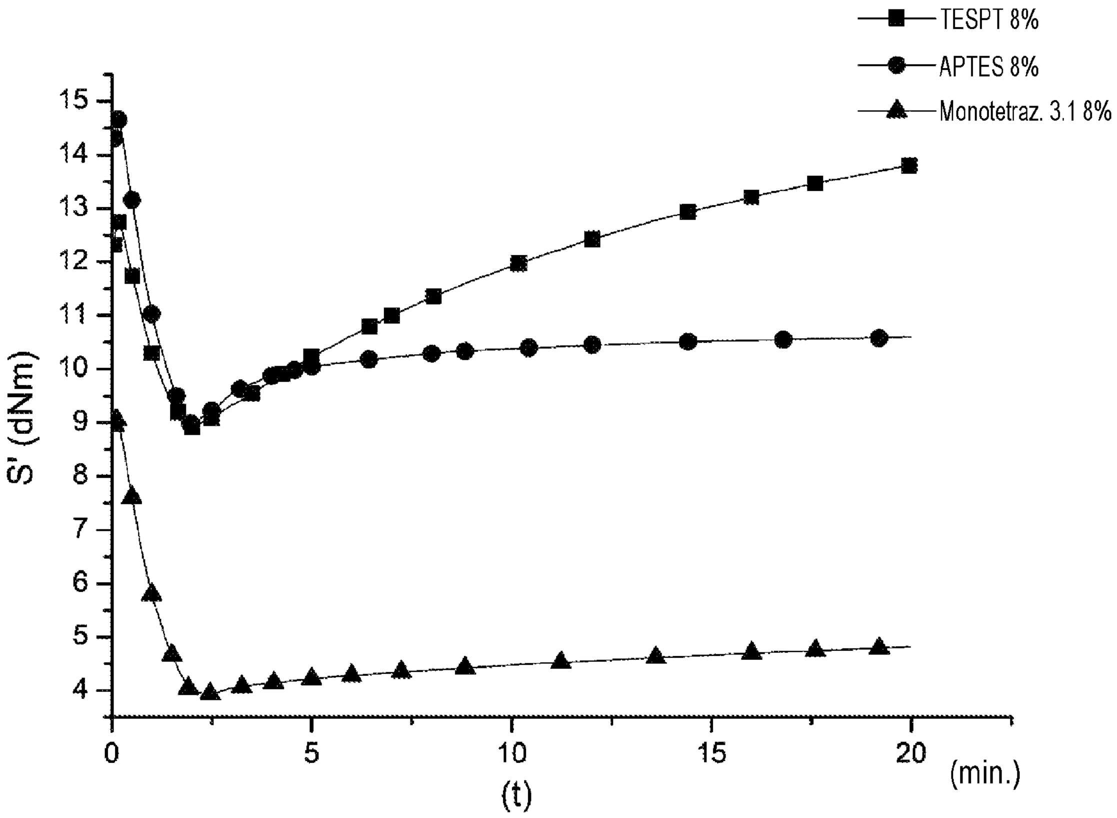
FIG. 8 shows the trend of the pair S' of comparative first step compounds (TESPT, APTES) and of the invention (monotetrazole 3.1) (8% with respect to the silica content)
Figure 9:
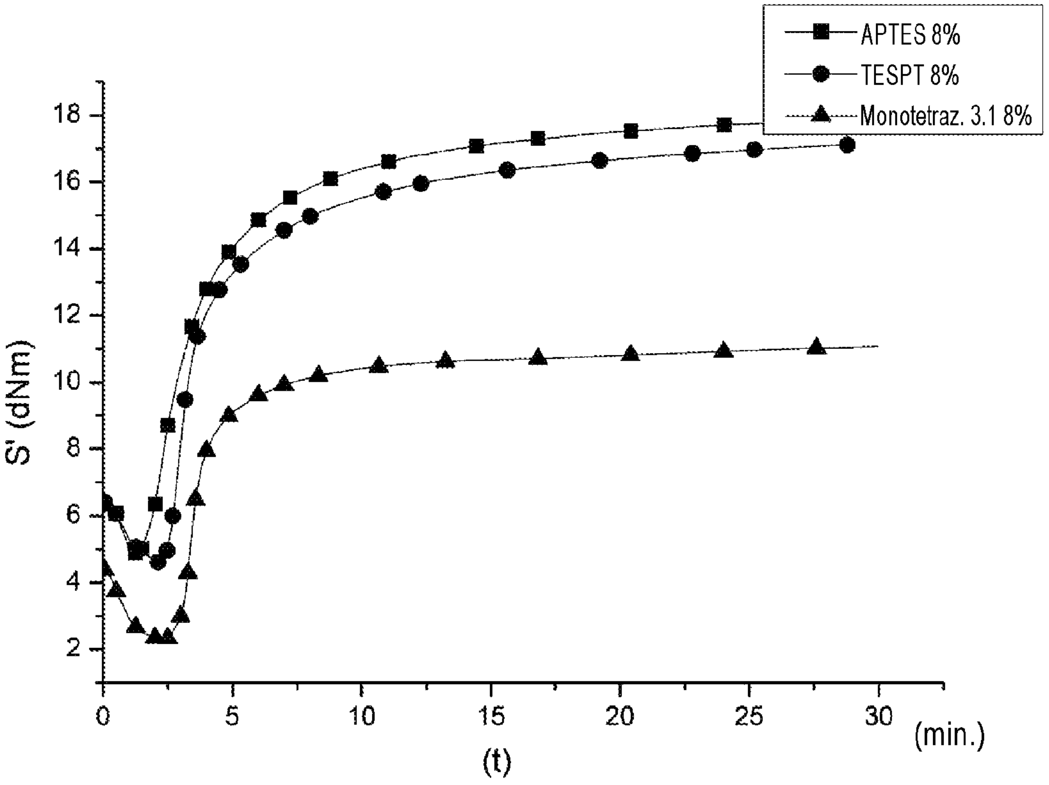
FIG. 9 shows the trend of the pair S' of comparative final compounds (TESPT, APTES) and of the invention (monotetrazole 3.1) (8% with respect to the silica content)
Figure 10:
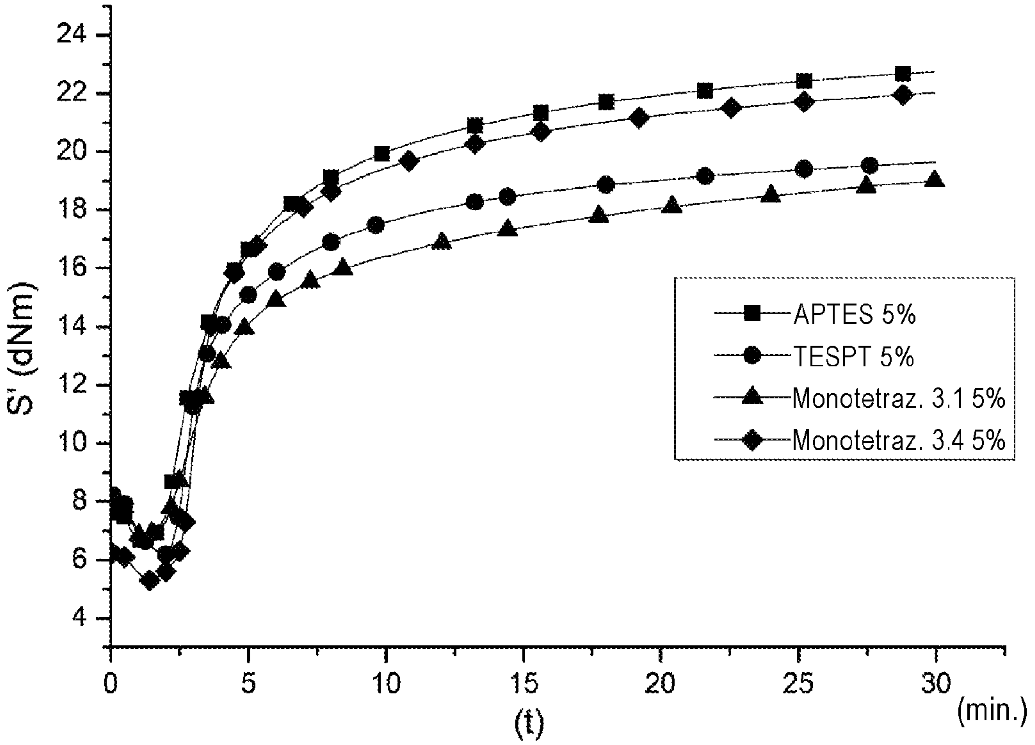
FIG. 10 shows the trend of the pair S' of comparative final compounds (TESPT, APTES) and of the invention (monotetrazole 3.1, monotetrazole 3.4) (5% with respect to the silica content).

The values of S' measured for the first and final step compounds, comparative and according to the invention, are reported in FIGS. 8-10.

The samples of the final compounds were subjected to the measurement of the dynamic properties, i.e. the dynamic shear modulus G', the viscous dynamic shear modulus G"% at 70° C., frequency 10 Hz (in the deformation range between 0.1% and 100% for samples not yet subjected to thermal cycling above 130° C. and between 0.1% and 10% for samples subjected to at least one thermal cycle above 130° C.), with the results reported in Tables 4 and 5.

Measurement of Static Mechanical Properties

The elastomeric materials prepared in the previous examples were vulcanised to give specimens on which the evaluation of the static mechanical properties was carried out.

The tensile tests were carried out on straight axis Dumbbell specimens.

Unless otherwise indicated, vulcanisation was carried out in a mould, in hydraulic press at 190° C. and at a pressure of 200 bar for about 30 minutes.

The static mechanical properties were measured at 23° C. according to the ISO 37:2005 standard.

In particular, the load at different elongation levels (50%, 100% and 300%, respectively called CA0.5, CA1 and CA3), the load at break CR and the elongation at break AR % were measured, with the results shown in Table 6.

Example 1

Study of the Thermal Stability of 2,5-Disubstituted Monotetrazoles

To understand the influence of the substituent groups present in position 2 and 5 of the tetrazole on the activation temperature Ta, the 2,5 disubstituted monotetrazoles 1.1-1.23 of formula (I) shown in the following Table 1 were prepared:

TABLE 1
| Monotetrazole n. | Formula | Activation T ° C. |
| --- | --- | --- |
| 1.1 | 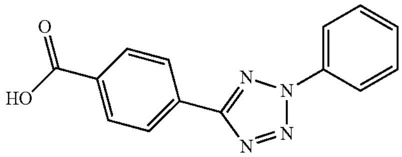 [SMILES: O=C(O)c1ccc(-c2nnn(-c3ccccc3)n2)cc1] | 210 |
| 1.2 | 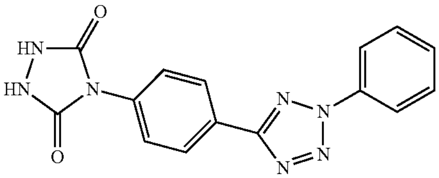 [SMILES: O=c1[nH][nH]c(=O)n1-c1ccc(-c2nnn(-c3ccccc3)n2)cc1] | 200 |
| 1.3 | 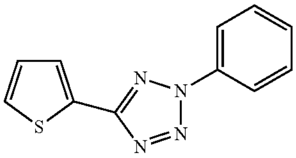 [SMILES: c1ccc(-n2nnc(-c3cccs3)n2)cc1] | 150 |
| 1.4 | 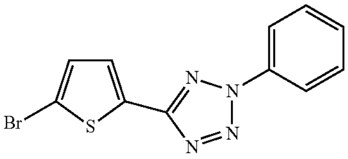 [SMILES: Brc1ccc(-c2nnn(-c3ccccc3)n2)s1] | 150 |
| 1.5 | 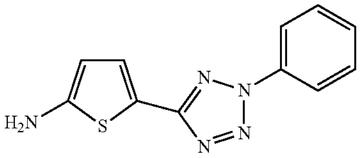 [SMILES: Nc1ccc(-c2nnn(-c3ccccc3)n2)s1] | 165 |
| 1.6 | 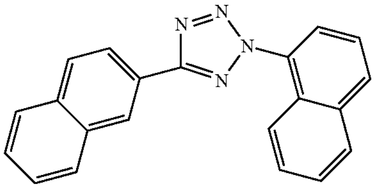 [SMILES: c1ccc2cc(-c3nnn(-c4cccc5ccccc45)n3)ccc2c1] | 100 |
| 1.7 | 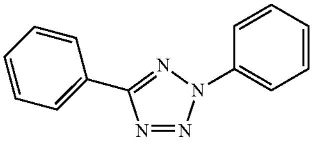 [SMILES: c1ccc(-c2nnn(-c3ccccc3)n2)cc1] | 170 |
| 1.8 | 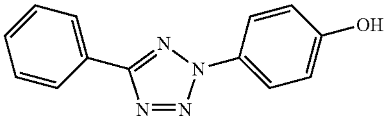 [SMILES: Oc1ccc(-n2nnc(-c3ccccc3)n2)cc1] | 150 |

TABLE 1-continued
| Monotetrazole n. | Formula | Activation T ° C. |
|---|---|---|
| 1.9 | 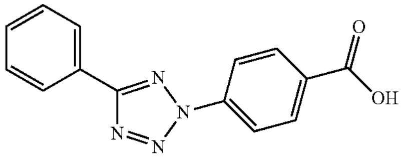 [SMILES: O=C(O)c1ccc(-n2nnc(-c3ccccc3)n2)cc1] | 180 |
| 1.10 | 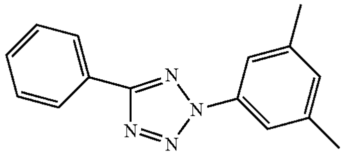 [SMILES: Cc1cc(C)cc(-n2nnc(-c3ccccc3)n2)c1] | 165 |
| 1.11 | 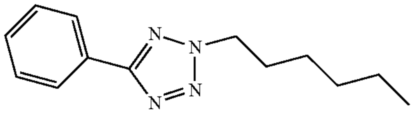 [SMILES: CCCCCCn1nnc(-c2ccccc2)n1] | 150 |
| 1.12 | 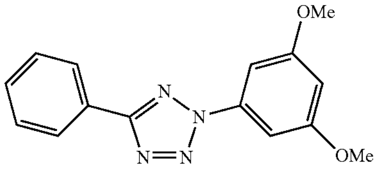 [SMILES: COc1cc(OC)cc(-n2nnc(-c3ccccc3)n2)c1] | 160 |
| 1.13 | 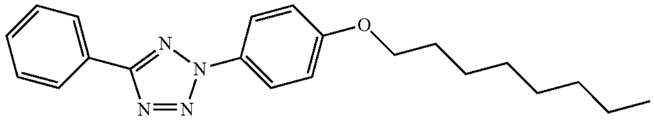 [SMILES: CCCCCCCCOc1ccc(-n2nnc(-c3ccccc3)n2)cc1] | 180 |
| 1.14 | 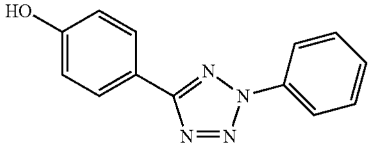 [SMILES: Oc1ccc(-c2nnn(-c3ccccc3)n2)cc1] | 190 |
| 1.15 | 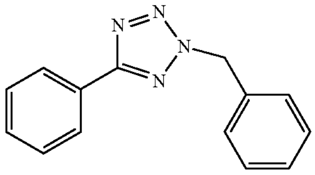 [SMILES: c1ccc(Cn2nnc(-c3ccccc3)n2)cc1] | 200 |
| 1.16 | 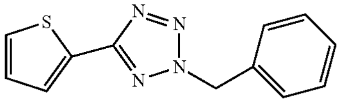 [SMILES: c1ccc(Cn2nnc(-c3cccs3)n2)cc1] | 210 |
| 1.17 | 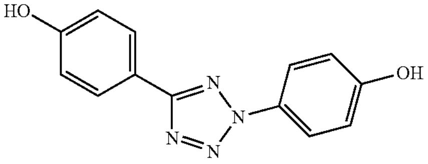 [SMILES: Oc1ccc(-c2nnn(-c3ccc(O)cc3)n2)cc1] | 180 |

TABLE 1-continued

| Monotetrazole n. | Formula | Activation T ° C. |
|---|---|---|
| 1.18 | 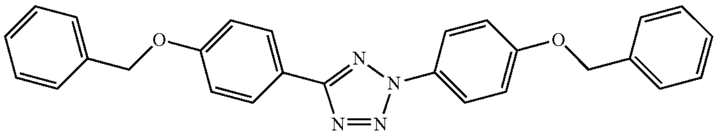 [SMILES: c1ccc(COc2ccc(-c3nnn(-c4ccc(OCc5ccccc5)cc4)n3)cc2)cc1] | 250 |
| 1.19 | 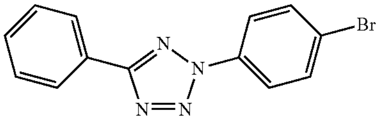 [SMILES: Brc1ccc(-n2nnc(-c3ccccc3)n2)cc1] | 170 |
| 1.20 | 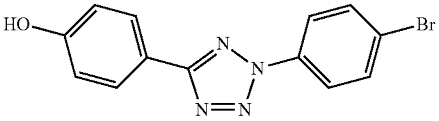 [SMILES: Oc1ccc(-c2nnn(-c3ccc(Br)cc3)n2)cc1] | 200 |
| 1.21 | 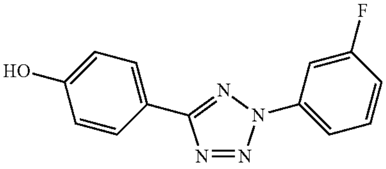 [SMILES: Oc1ccc(-c2nnn(-c3cccc(F)c3)n2)cc1] | 180 |
| 1.22 | 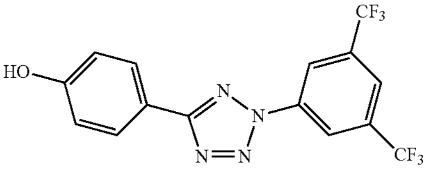 [SMILES: Oc1ccc(-c2nnn(-c3cc(C(F)(F)F)cc(C(F)(F)F)c3)n2)cc1] | 190 |
| 1.23 | 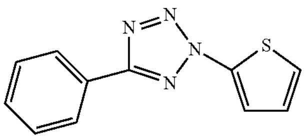 [SMILES: c1ccc(-c2nnn(-c3cccs3)n2)cc1] | 150 |

These monotetrazoles were synthesised and then studied by thermogravimetric analysis, in order to investigate the effect of the substituent groups present in position 2 and 5 on the activation temperature Ta of tetrazole.

Synthesis of 2,5-Disubstituted Monotetrazoles

The tetrazolic agents having an aromatic group in position 2 and an aromatic group optionally substituted in position 5, were prepared as described in Chem. Commun. (2016). 52, 9426, according to the following general synthesis scheme 2.1, herein exemplified for derivatives in which the aromatic group in 5 is a phenyl but similarly applicable to derivatives in which said group is another aromatic system:

Scheme 2.1

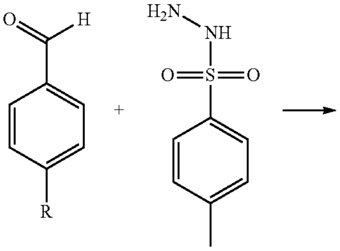

-continued

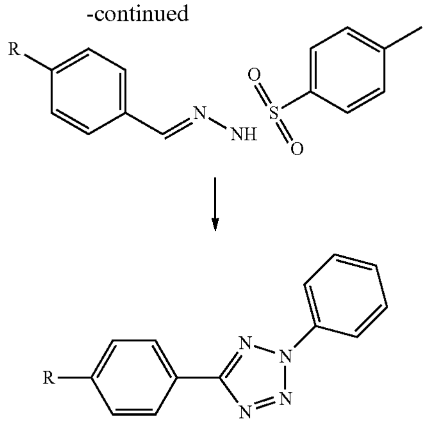

As reported in the literature, the synthesis included two steps:

The aromatic aldehyde (1 eq.) was dissolved in ethanol. Tosylhydrazide (2 eq.) was added and stirred for 4 h at reflux. Water was then added, then the precipitate formed was recovered by filtration. The product thus obtained was used for the second step without further purification.

The solid obtained in step 1 (1 eq.) was dissolved in pyridine to give solution A. In parallel, solution B was prepared by adding a solution of $NaNO_2$ (1 eq.) in water (xml) to a cooled solution of aniline (1 eq.), conc. HCl and water/ethanol (1:1). Solution B, cooled with an ice bath, was added slowly to solution A by dropping and at the end of the addition it was stirred overnight at room temperature. Subsequently, the reaction mixture was neutralised with diluted HCl, recovering the precipitate formed by filtration. The reaction crude was purified by means of a chromatographic column or crystallized from a suitable solvent according to the type of tetrazole.

The monotetrazoles 1.11, 1.15 and 1.16 were prepared by alkylation according to the general Scheme 3, more particularly according to the following Schemes 4-6.

Synthesis of Monotetrazole 1.11

Monotetrazole 1.11 was prepared according to the following Scheme 4:

Scheme 4

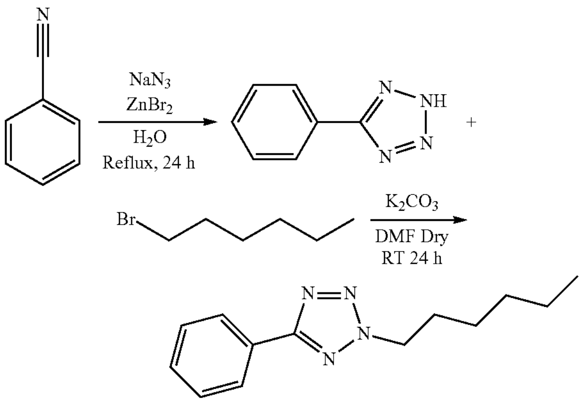

Step 1

Benzonitrile (1 eq.) was suspended in $H_2O$, $ZnBr_2$ (1 eq.) and sodium azide (1.1 eq.) were added. The mixture was heated under reflux for 48 h under stirring. The reaction was quenched with HCl (37%) and extracted with ethyl acetate. The organic phase was dried and the solvent evaporated under reduced pressure. The solid obtained was treated with a 0.25 M NaOH solution, stirring for 30 minutes. The zinc oxide thus formed was filtered by washing with 1 N NaOH. The aqueous solution thus obtained was treated with concentrated HCl up to an acid pH. The precipitated tetrazole was recovered, filtering and washing with 3 M HCl and finally drying the product in an oven. The tetrazole was recovered as a white powder (yield 76%).

Step 2

The glassware was ignited under the flow of $N_2$. The 5-phenyl-tetrazole (1 eq.) was dissolved in anhydrous dimethylformamide, $K_2CO_3$ (1.2 eq.) was added and after 15 minutes 1-bromohexane (1 eq.) was added, it was stirred magnetically for 24 h at ambient temperature.

The reaction mixture was extracted with dichloromethane. The organic phase was dried and evaporated under reduced pressure. The reaction crude was purified by column chromatography, obtaining 2-hexyl-5-phenyl-tetrazole as a colourless oil (yield 90%).

Synthesis of Monotetrazole 1.15

Monotetrazole 1.15 was prepared according to the following Scheme 5:

Scheme 5

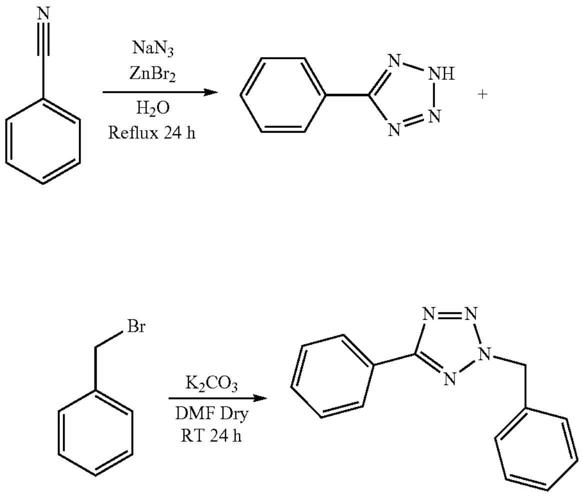

Step 1

Benzonitrile (1 eq.) was suspended in $H_2O$, $ZnBr_2$ (1 eq.) and sodium azide (1.1 eq.) were added. The mixture was heated under reflux for 48 h under stirring.

The reaction was quenched with HCl (37%) and extracted with ethyl acetate. The organic phase was dried and the solvent evaporated under reduced pressure. The solid obtained was treated with a 0.25 M NaOH solution, stirring for 30 minutes. The zinc oxide thus formed was filtered by washing with 1 N NaOH. The aqueous solution thus obtained was treated with concentrated HCl up to an acid pH. The precipitated tetrazole was recovered, filtering and washing with 3 M HCl and finally drying the product in an oven. The tetrazole was recovered as a white powder (yield 76%).

Step 2

The glassware was ignited under the flow of $N_2$. The 5-phenyl-tetrazole (1 eq.) was dissolved in anhydrous dimethylformamide, $K_2CO_3$ (1.2 eq.) was added and after 15 minutes benzyl bromide (1 eq.) was added, it was stirred magnetically for 24 h at ambient temperature.

The reaction mixture was extracted with dichloromethane. The organic phase was dried and evaporated under reduced pressure. The reaction crude was purified by column chromatography, obtaining 2-benzyl-5-phenyl-tetrazole as a white solid (yield 90%).

Synthesis of Monotetrazole 1.16

Monotetrazole 1.16 was prepared according to the following Scheme 6:

Scheme 6

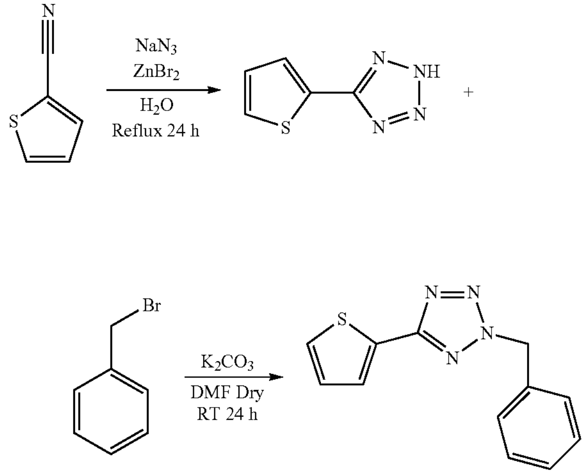

Step 1

2-Thiophencarbonitrile (1 eq.) was suspended in $H_2O$, $ZnBr_2$ (1 eq.) and sodium azide (1.1 eq.) were added. The mixture was heated under reflux for 48 h under stirring.

The reaction was quenched with HCl (37%) and extracted with ethyl acetate. The organic phase was dried and the solvent evaporated under reduced pressure. The solid obtained was treated with a 0.25 M NaOH solution, stirring for 30 minutes. The zinc oxide thus formed was filtered by washing with 1 N NaOH, The aqueous solution thus obtained was treated with concentrated HCl up to an acid pH. The precipitated tetrazole was recovered, filtering and washing with 3 M HCl and finally drying the product in an oven. The tetrazole was recovered as a white powder (yield 74%).

Step 2

The glassware was ignited under the flow of $N_2$. The 5-thiophenyl-tetrazole (1 eq.) was dissolved in anhydrous dimethylformamide, $K_2CO_3$ (1.2 eq.) was added and after 15 minutes benzyl bromide (1 eq.) was added, it was stirred magnetically for 24 h at ambient temperature.

The reaction mixture was extracted with dichloromethane. The organic phase was dried and evaporated under reduced pressure. The reaction crude was purified by column chromatography, obtaining 2-benzyl-5-(thiophen-2-yl)-tetrazole as a white solid (yield 85%).

Characterisation of the Monotetrazole Compatibilizing Agents 1.1-1.23 Thermogravimetric Analysis The 2,5-disubstituted monotetrazoles shown in Table 1 were subjected to thermogravimetric analysis according to the method described above.

Figure 3:
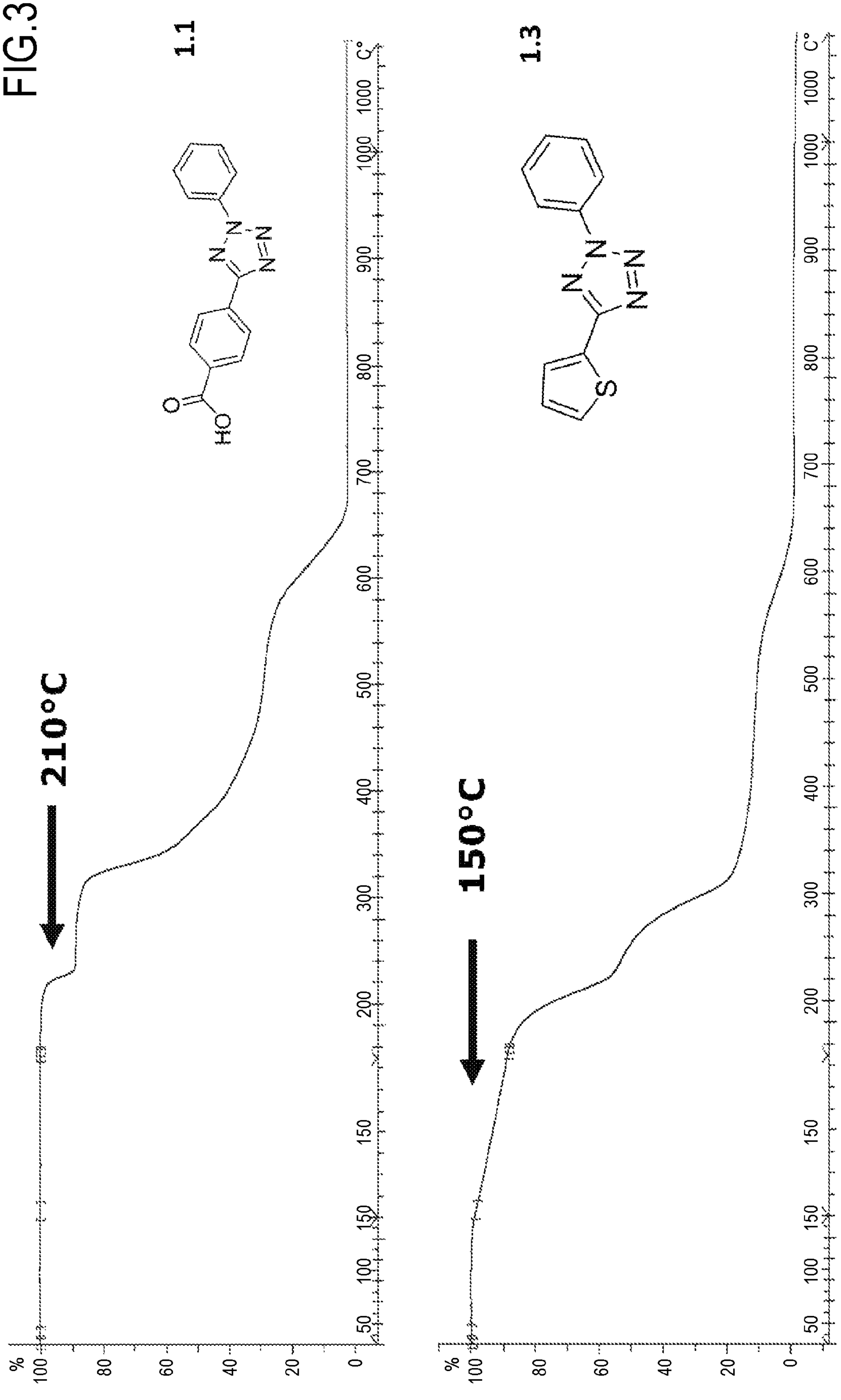
FIG. 3 shows the plots of the thermogravimetric analysis (TGA) of the 2,5-disubstituted tetrazoles 1.1 and 1.3.

FIG. 3 shows the plots obtained in the TGA of monotetrazoles 1.1 and 1.3. As can be seen, the monotetrazole 1.1 showed a net jump around 210° C. upon the decomposition of the tetrazole ring with release of nitrogen. The monotetrazole 1.3 instead gave rise to a more gradual decomposition starting from about 150° C.

As shown in Table 1, the activation temperature Ta of these derivatives was between 150 and 250° C. and was influenced by the nature of the substituent groups present in position 2 and 5.

In particular, it was observed that electron withdrawing groups, such as for example carboxyl or triazolidinedione (monotetrazoles 1.1 and 1.2), if present in the para position of a phenyl bonded to the carbon of the tetrazole ring, stabilised the tetrazole by increasing the activation temperature Ta, while the electron donor groups such as thiophene, possibly substituted with amino (monotetrazole 1.3 and 1.5) when bound to the carbon of the tetrazole ring had the opposite effect.

From the values of activation temperature Ta reported in Table 1 it appeared as if tetrazoles with activation T included within a wide range of temperatures of technological interest were synthetically obtainable.

By suitably combining the substituents on the tetrazole it was therefore possible to adapt the activation temperature Ta of the system to the desired application.

Example 2

Cyclo-Addition Tests with Unsaturated Polymers

To verify the reactivity of the 2,5-disubstituted monotetrazoles compounds towards the double bonds of polymers, represented in the case of terminal vinyls in the following Scheme 7:

Scheme 7

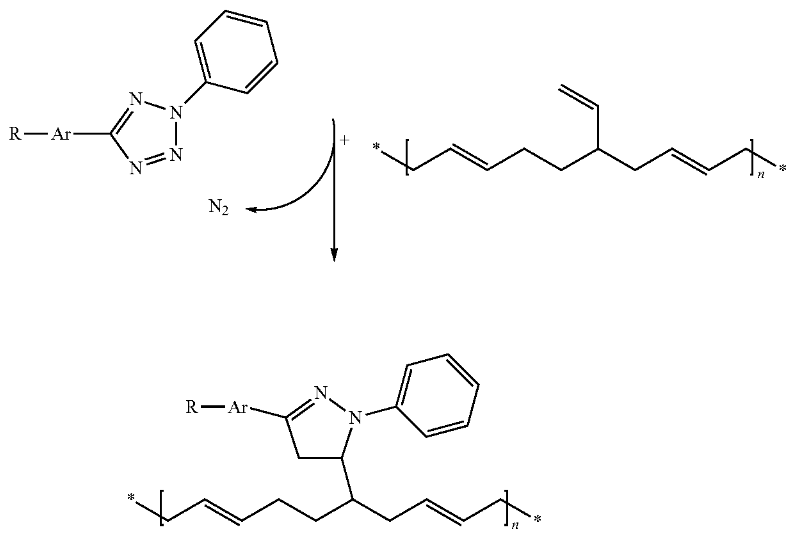

cyclo-addition tests were carried out with some monotetrazoles of Table 1, with an oligomer as described in the following Examples 2a, 2b and 2c.

For these preliminary cyclo-addition tests useful for evaluating the reactivity of 2,5-disubstituted tetrazoles towards the reactive double bonds of elastomers, the liquid polybutadiene Polyvest 130S was selected because, being liquid, it was easy to mix even without using solvent.

Example 2a: the selected tetrazole derivative and the Polyvest 130S oligomer (tetrazole/polymer ratio 1:100 in moles, tetrazole/polymer vinyl groups ratio 1:1) were mixed in a glass test tube, in the absence of solvent, and the mixture was heated for 15-30 minutes to the tetrazole activation temperature Ta.

The formation of pyrazoline from cyclo-addition was highlighted by fluorescence under UV light (365 nm) of the samples and confirmed by the IR and NMR spectra measured at the end of the reaction on the oligomer modified with tetrazole and after having precipitated it in ethanol. The oligomer was subsequently suspended in ethanol and centrifuged (repeating this process 3 times) to remove the unreacted tetrazole and by-products.

Figure 4:
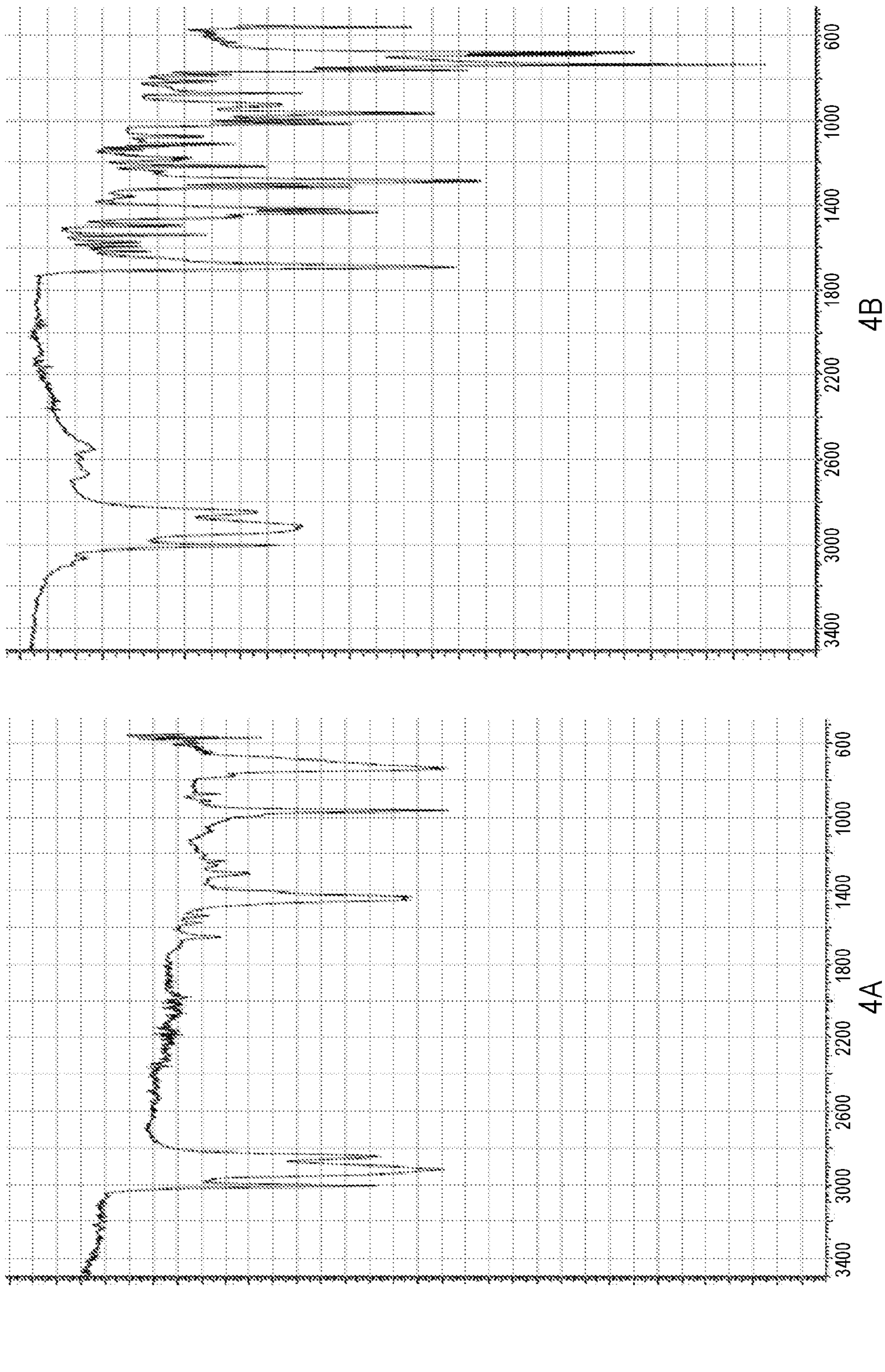
FIG. 4 shows the IR spectrum of Polyvest oligobutadiene (4A) and its reaction product with tetrazole 1.1 (4B)

FIG. 4 shows the IR spectra of the Polyvest 130S (FIG. 4A) and of the reaction product between the monotetrazole 1.1 and the Polyvest 130S (FIG. 4B) measured with the Perkin-Elmer spectrum 100 (FT-IR) apparatus.

Figure 5:
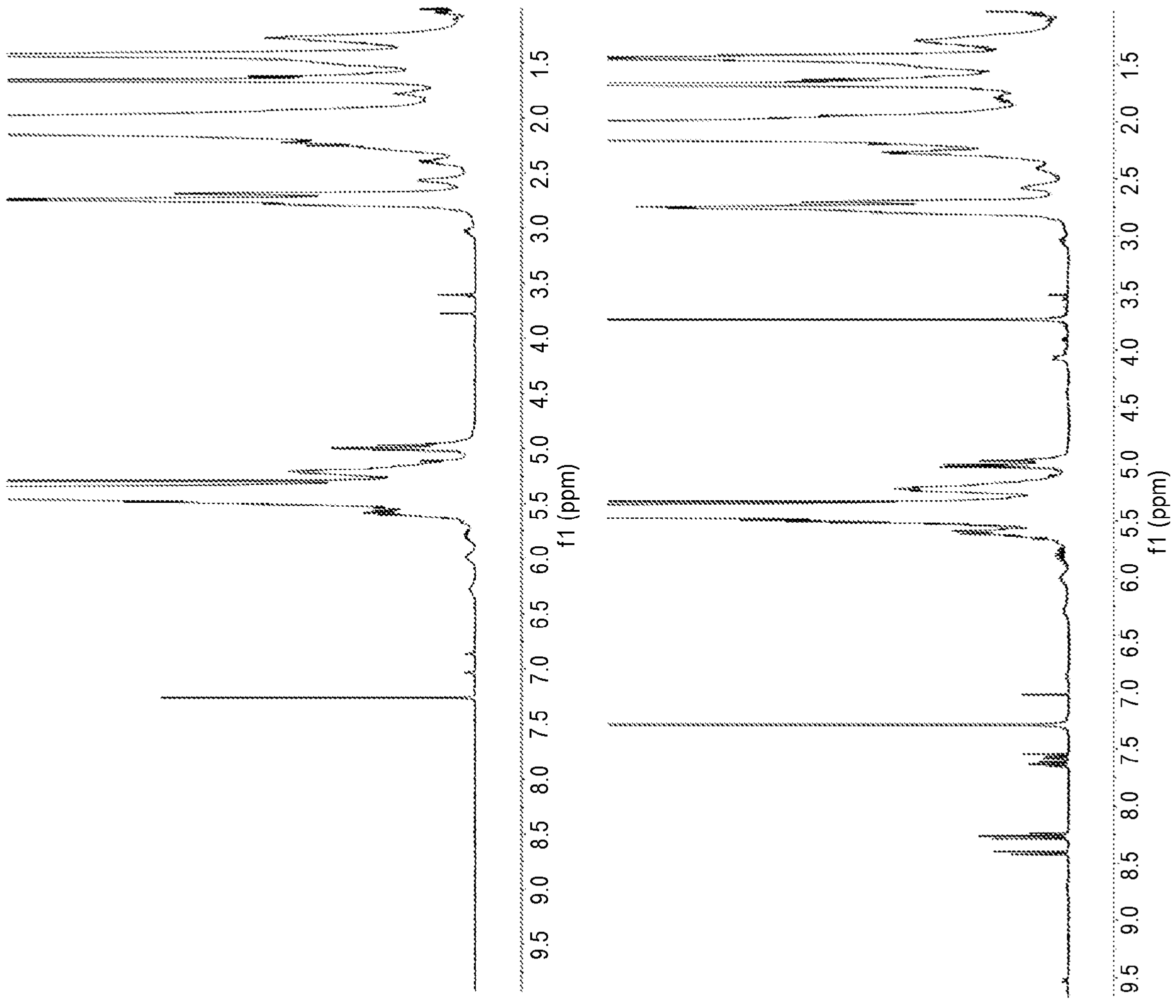
FIG. 5 shows the H-NMR spectrum of Polyvest oligobutadiene before (5A) and after (5B) the cycloaddition reaction with the 2,5 disubstituted tetrazole 1.1.

FIG. 5 shows the H-NMR spectrum of the Polyvest before (FIG. 5A) and after (FIG. 5B) the cyclo-addition reaction with the monotetrazole 1.1.

In the 1H-NMR spectrum after the reaction (FIG. 5B) new signals can be seen compared to those of the Polyvest, attributable to the formation of pyrazoline, in particular the signals around 9.5 ppm (carboxyl proton), those between 8.5 and 8.0 ppm (phenyl protons) and those around 4 ppm (pyrazoline ring protons).

From the tests and analyses carried out in this example it was shown that the tetrazole had decomposed and the nitrilimine had reacted with the double bonds of the Polyvest, providing the corresponding pyrazoline, thus functionalising the oligomer.

Example 2b: the selected monotetrazole and the Polyvest 130S oligomer were mixed in a vial, heating to 70° C. to make the oligomer more fluid and better disperse the tetrazole. A part of the mixture was then placed in the crucible of the thermogravimeter.

The mixture was heated in TGA up to a T higher than the tetrazole activation temperature Ta by at least 20° C. with a heating ramp that led from 70° C. to the final T in 5 minutes, then maintaining this temperature for at least other 5 minutes. Monotetrazole 1.3 was observed to decompose only when the activation T was reached and exceeded.

Example 2c: Another way of heating the Polyvest 130S-monotetrazole 1.3 mixture in TGA was also tested which reproduced the thermal steps to which the elastomeric compound is typically subjected under normal tyre production conditions, comprising in succession: a first heating to 140° C. for 30 minutes, corresponding to an initial mixing step in the absence of monotetrazole, a cooling to 40° C., a heating to 90° C. for 30 minutes, corresponding to the mixing production step with incorporation of the monotetrazole, a second cooling to 30° C. and finally a heating that mimics the reaction conditions with T increasing up to at least 20° C. above the activation temperature Ta of the monotetrazole. As shown by the only weight loss detectable by TGA, it was observed that the monotetrazole 1.3 remained unchanged for the entire thermal processing cycle of the compound to activate only when the activation T was reached and exceeded.

Figure 6:
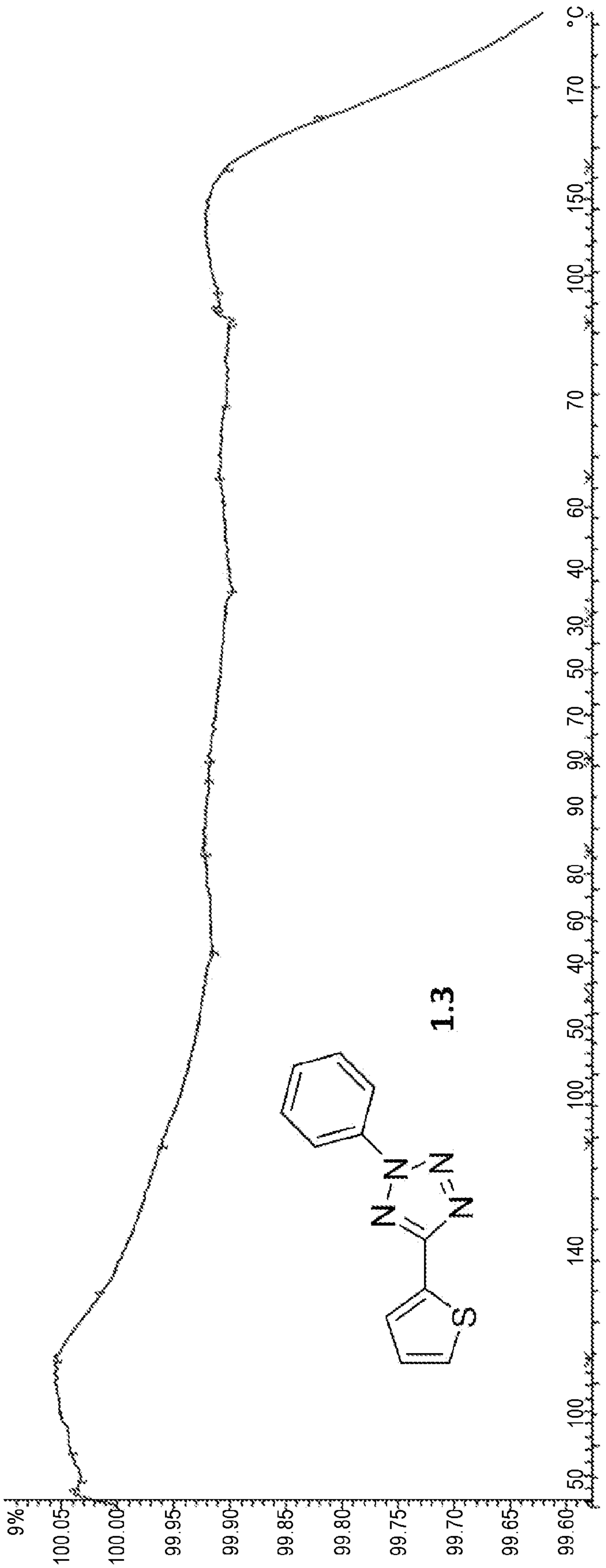
FIG. 6 shows the plot of the thermogravimetric analysis (TGA) of a sample comprising a mixture of Polyvest oligobutadiene and 2,5 disubstituted tetrazole 1.3.

FIG. 6 shows the thermogram with the rapid decrease in the weight of the sample comprising monotetrazole 1.3 at temperatures above its activation temperature Ta of 150° C.

Example 3

Synthesis of 2,5-Disubstituted Monotetrazoles

Other 2,5-disubstituted monotetrazoles of formula (I) were synthesised and characterised, reported in the following Table 2 together with some comparative compounds:

TABLE 2

| no. | Formula (I) | Brute formula | MW g/mol | A.T ° |
|---|---|---|---|---|
| 3.1 | 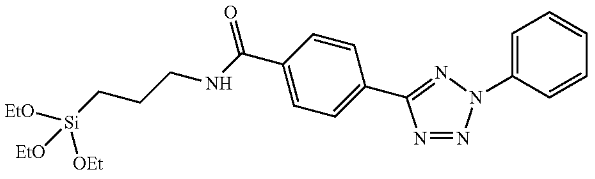 [SMILES: CCO[Si](CCCNC(=O)c1ccc(-c2nnn(-c3ccccc3)n2)cc1)(OCC)OCC] | $C_{23}H_{31}N_5O_4Si$ | 469.61 | 190 |
| 3.2 | 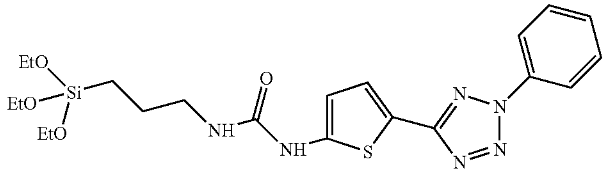 [SMILES: CCO[Si](CCCNC(=O)Nc1ccc(-c2nnn(-c3ccccc3)n2)s1)(OCC)OCC] | $C_{21}H_{30}N_6O_4SSi$ | 490.65 | 150 |
| 3.3 | 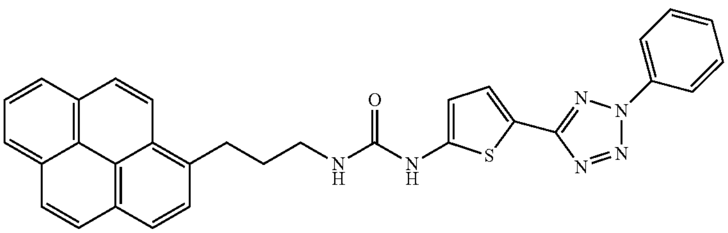 [SMILES: O=C(NCCCc1ccc2ccc3cccc4ccc1c2c34)Nc1ccc(-c2nnn(-c3ccccc3)n2)s1] | $C_{31}H_{24}N_6OS$ | 528.63 | 180 |
| 3.4 | 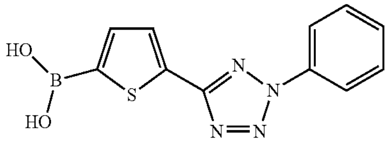 [SMILES: OB(O)c1ccc(-c2nnn(-c3ccccc3)n2)s1] | $C_{11}H_9N_4O_2BS$ | 272.09 | 140 |
| 3.5 | 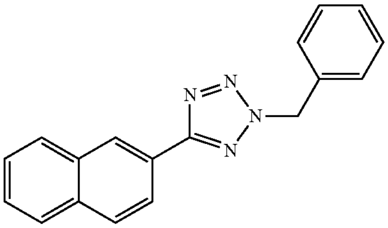 [SMILES: c1ccc(Cn2nnc(-c3ccc4ccccc4c3)n2)cc1] | $C_{18}H_{14}N_4$ | 286.33 | 230 |
| TESPT | 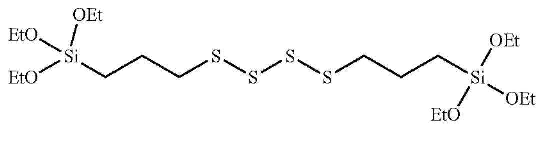 [SMILES: CCO[Si](CCCSSSSCCC[Si](OCC)(OCC)OCC)(OCC)OCC] | $C_{18}H_{42}O_6S_4Si_2$ | 538.95 | from 150* |
| APTES | 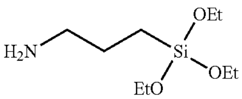 [SMILES: CCO[Si](CCCN)(OCC)OCC] | $C_9H_{23}NO_3Si$ | 221.37 | — |

*activation temperature in the elastomeric compound (as per the studies reported on page 191, of the article "Effects of time and temperature on reaction of TESPT silane coupling agent during mixing with silica filler and tyre rubber", by LAEM Reuvekamp et al, pages 187-198, vol. 75, Rubber Chemistry and technology).

TESPT bis(3-triethoxysilyl-propyl)tetrasulphide and APTES (3-aminopropyl)triethoxysilane were tested as comparatives.

The monotetrazoles 3.1, 3.2 and 3.4 appear to be suitable compatibilisers for silica and silicate fibres while the monotetrazoles 3.3 and 3.5 for carbon black, given the high affinity of the pyrene and naphthalene core for this filler.

Synthesis of Monotetrazole 3.1

Monotetrazole 3.1 was prepared according to the following Scheme 8:

Step 1

Scheme 8

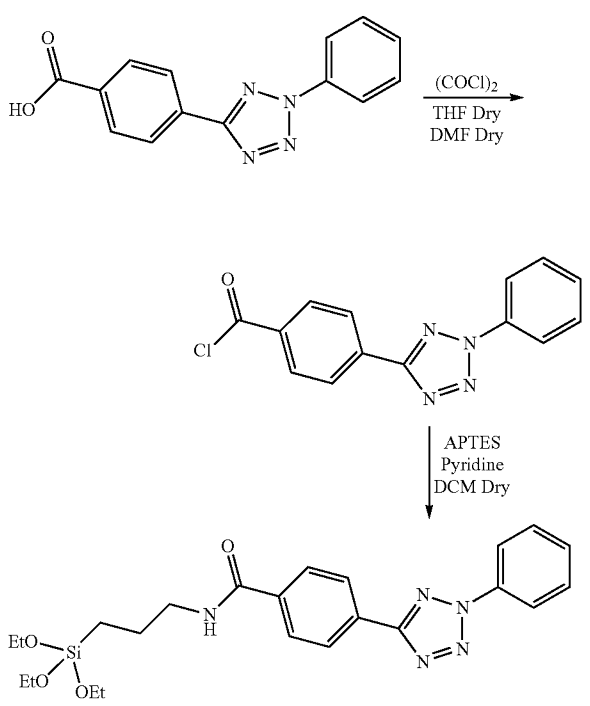

The glassware was ignited under the flow of $N_2$. Tetrazole 1.1 (1 eq.) was dissolved in anhydrous THF, stirring magnetically. Two drops of DMF and then oxalyl chloride (2 eq.) were added and heated under reflux for 2 hours. The solvent was evaporated under reduced pressure, obtaining an orange solid (99% yield)

Step 2

The glassware was ignited under the flow of $N_2$. The product obtained in the first step (1 eq.) was dissolved in anhydrous dichloromethane (dichloromethane), stirring magnetically. Pyridine (1 eq.) and subsequently APTES (0.95 eq.) were added, stirred at room temperature for 24 hours.

The solvent was evaporated under reduced pressure, washing with dichloromethane. A dark brown solid was obtained (83% yield).

1H-NMR (400 MHz, DMSO): δ 8.50 (s, 1H), 8.14 (dd, J=8.3, 1.0 Hz, 1H), 7.93 (d, J=3.6 Hz, 1H), 7.78 (d, J=3.6 Hz, 1H), 7.74-7.67 (m, 1H), 7.67-7.61 (m, 1H). From the thermogravimetric analysis (see thermogram in FIG. 7A) it could be observed that at a temperature around 190° C. there was decomposition with weight loss due to the release of nitrogen. The activation temperature Ta thus measured is shown in the previous Table 2.

Synthesis of Monotetrazole 3.2

Monotetrazole 3.2 was prepared according to the following Scheme 9:

Scheme 9

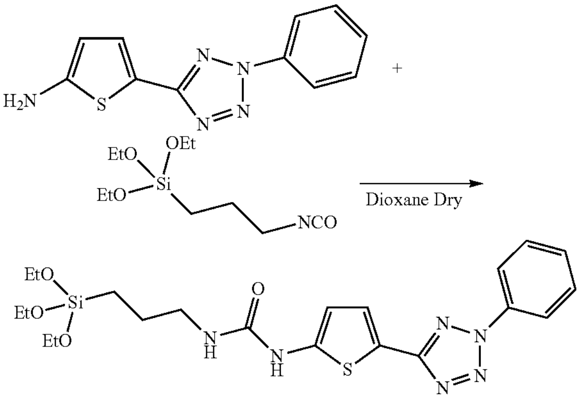

The glassware was ignited under the flow of $N_2$. Tetrazole 1.5 (1 eq.) was dissolved in anhydrous dioxane, stirring magnetically. The isocyanate (1 eq.) was added and stirred under reflux for about 3 hours.

The solvent was evaporated under reduced pressure. A dark brown oil was obtained (94% yield).

From the thermogravimetric analysis (see thermogram in FIG. 7B) it could be observed that at a temperature around 150° C. there was decomposition with weight loss due to the release of nitrogen.

The activation temperature Ta thus measured is shown in the previous Table 2.

Synthesis of Monotetrazole 3.3

Monotetrazole 3.3 was prepared according to the following Scheme 10:

Scheme 10

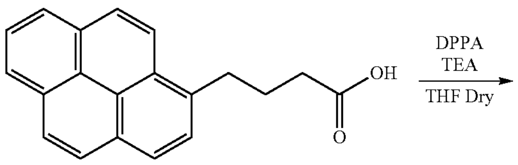

-continued

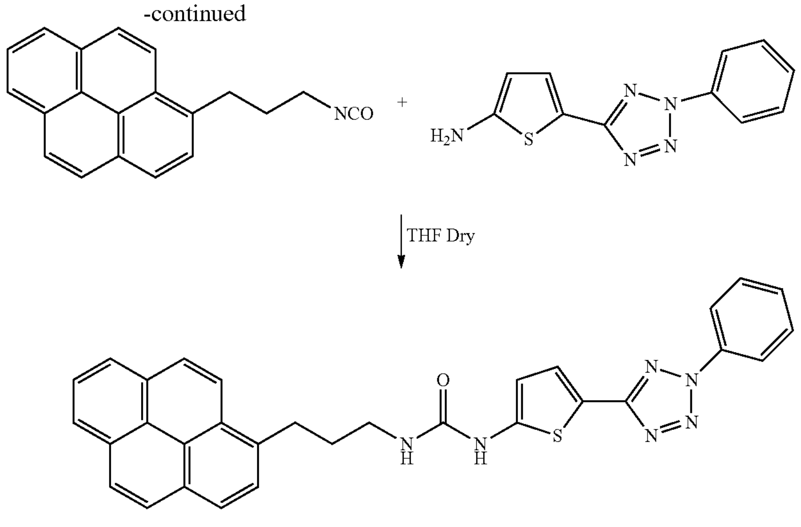

The glassware was ignited under the flow of $N_2$. Pyrenbutyric acid (1 eq.) was dissolved in anhydrous tetrahydrofuran (THF), cooling to 0° C. Diphenylphosphoryl azide (DPPA 1.1 eq.) was added and, after about 10 minutes, triethylamine (TEA, 1.1 eq.). It was stirred under reflux for 3 hours. Tetrazole 1.5 (1 eq.) was dissolved in anhydrous THF and dropped into the previous solution. It was stirred under reflux for 3 hours. The solvent was evaporated under reduced pressure. The crude obtained was extracted with dichloromethane, first washing with aq. $NaHCO_3$, then with water and subsequently with HCl (1 M). The organic phase was dried and evaporated under reduced pressure.

The solid obtained with Soxhlet was extracted in ethyl acetate and a white solid was obtained (55% yield).

$^1$H NMR (400 MHz, DMSO) δ 10.02 (s, 1H), 8.39 (d, J=9.3 Hz, 1H), 8.31-8.22 (m, 4H), 8.15 (d, J=2.8 Hz, 2H), 8.13-8.09 (m, 2H), 8.07 (t, J=7.6 Hz, 1H), 8.01 (d, J=7.8 Hz, 1H), 7.72-7.65 (m, 2H), 7.63 (d, J=1.3 Hz, 1H), 7.60 (d, J=4.0 Hz, 1H), 6.68 (t, J=5.6 Hz, 1H), 6.57 (d, J=4.0 Hz, 1H), 3.43-3.36 (m, 2H), 2.01 (dt, J=14.5, 7.2 Hz, 2H).

From the thermogravimetric analysis (see thermogram in FIG. 7C) it could be observed that at a temperature around 180° C. there was decomposition with weight loss due to the release of nitrogen. The activation temperature Ta thus measured is shown in the previous Table 2.

Synthesis of Monotetrazole 3.4

Monotetrazole 3.4 was prepared according to the following Scheme 11:

Scheme 11

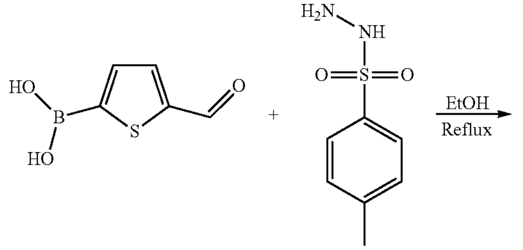

-continued

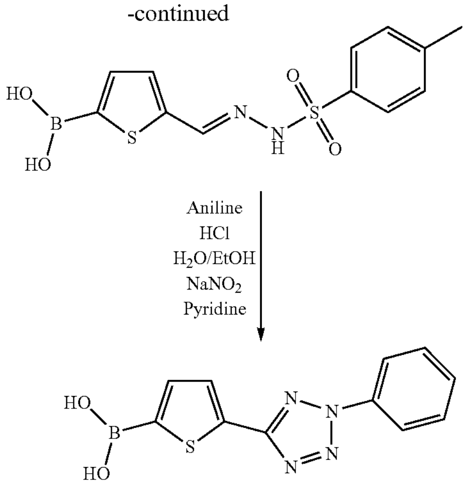

Step 1

The 5-formyl-2-thienylboronic acid (1 eq.) was dissolved in ethanol. Tosylhydrazide (1 eq.) was added and stirred for 4 h at reflux.

Water was then added, then the precipitate formed was recovered by filtration. The product thus obtained was used for the second step without further purification.

Step 2

The solid obtained in step 1 (1 eq.) was dissolved in pyridine to give solution A. In parallel, solution B was prepared by adding a solution of $NaNO_2$ (1 eq.) in water to a cooled solution of aniline (1 eq.), conc. HCl and water/ethanol (1:1).

Solution B, cooled with an ice bath, was added slowly to solution A by dropping and at the end of the addition it was stirred overnight at room temperature. Subsequently, the reaction mixture was neutralised with diluted HCl, recovering the precipitate formed by filtration. The reaction crude was washed with dichloromethane to give a light orange solid.

$^1$H NMR (400 MHz, DMSO) δ 8.50 (s, 1H), 8.14 (dd, J=8.3, 1.0 Hz, 1H), 7.93 (d, J=3.6 Hz, 1H), 7.78 (d, J=3.6

Hz, 1H), 7.74-7.67 (m, 1H), 7.67-7.61 (m, 1H). From the thermogravimetric analysis (see thermogram in FIG. 7D) it could be observed that at a temperature around 140-150° C. there was decomposition with weight loss due to the release of nitrogen. The activation temperature Ta thus measured is shown in the previous Table 2.

Synthesis of Monotetrazole 3.5

Monotetrazole 3.5 was prepared according to the following Scheme 12:

Scheme 12

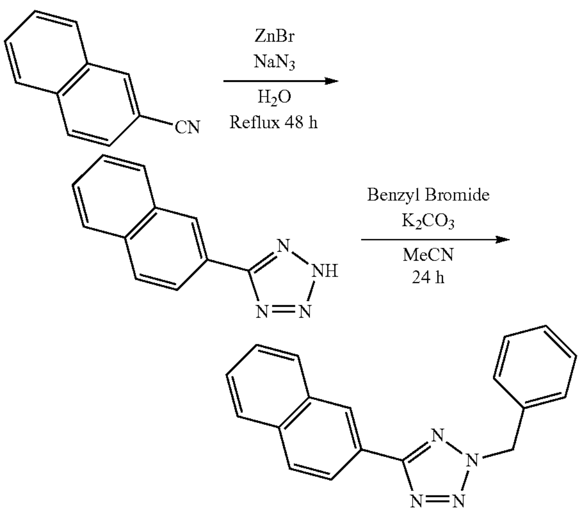

Step 1

Naphthalene-2-carbonitrile (1 eq.) was suspended in $H_2O$ and $ZnBr_2$ (1 eq.) and sodium azide (1,1 eq.) were added. The mixture was heated under reflux for 48 h under stirring.

The reaction was quenched with HCl (37%) and extracted with ethyl acetate. The organic phase was dried and the solvent evaporated under reduced pressure. The solid obtained was treated with a 0.25 M NaOH solution, stirring for 30 minutes. The zinc oxide thus formed was filtered by washing with 1 N NaOH. The aqueous solution thus obtained was treated with concentrated HCl up to an acid pH. The precipitated tetrazole was recovered, filtering and washing with 3 M HCl and finally drying the product in an oven. 5-naphthyl-tetrazole was obtained as a white powder (41% yield).

Step 2

The glassware was ignited under the flow of $N_2$. The 5-naphthyl-tetrazole (1 eq.) was dissolved in anhydrous acetonitrile, $K_2CO_3$ (10 eq.) was added and after 15 minutes the benzyl bromide (1 eq.) was stirred magnetically for 24 hours at room temperature.

The reaction mixture was extracted with dichloromethane. The organic phase was dried and evaporated under reduced pressure. The reaction crude was purified by column chromatography, obtaining 2-benzyl-5-(naphthalen-2-yl)-2H-tetrazole as a white solid (yield 38%).

$^1H$ NMR (400 MHz, $CDCl_3$) δ: 8.68 (s, 1H), 8.21 (d, 1H), 7.94 (d, 2H), 7.53 (m, 2H), 7.46 (d, 2H), 7.42-7.37 (dd, 4H), 5.85 (s, 2H).

From the thermogravimetric analysis (see thermogram in FIG. 7E) it could be observed that at a temperature around 230° C. there was decomposition with weight loss due to the release of nitrogen. The activation temperature Ta thus measured is shown in the previous Table 2.

Example 4

Evaluation of the Ability of Monotetrazole Compatibilizing Agents to Bind to the Double Bonds of Oligomers The 2,5-disubstituted monotetrazole compatibilizing agents 3.1-3.5 were dispersed in Polyvest 130, weighing a quantity of compatibilizing agent equal to about 0.5% of the weight of the oligomer, the dispersions introduced in a test tube and heated to activation temperatures identified by the TGA for about 30 minutes.

In each case a mass with marked fluorescence under UV light was obtained, indicating the pyrazoline formation and therefore the binding of the compatibilizing agent with the oligomer.

Example 5

Preparation of Elastomeric Compounds Including Silica

Elastomeric compounds were prepared comprising equal equivalents of a traditional silane compatibiliser TESPT (having two siloxane groups per molecule and sulphides for anchoring on the elastomer through sulphur bridges, Comp. ex. 5.1 and 5.5), of APTES (traditional silane compatibiliser having only a siloxane group, and an $NH_2$ group, Comp ex. 5.2 and 5.6) or a monotetrazole compatibiliser according to the invention (3.1 with a siloxane group or 3.4 with a boronic group, Ex. 5.3, 5.4 and 5.7). The quantities of the various components expressed in phr and in weight percentage and their addition step to the compound are shown in the following Table 3:

TABLE 3

| | elastomeric compositions | | | | | | | |
|---|---|---|---|---|---|---|---|---|
| Step | Ingredients phr (% pp) | Ex. 5.1 | Ex. 5.2 | Ex. 5.3 | Ex. 5.4 | Ex. 5.5 | Ex. 5.6 | Ex. 5.7 |
| | | Comp | Comp | Inv | Inv | Comp | Comp | Inv |
| 1.0 | SBR (equal to 100 phr) | 137 | 137 | 137 | 137 | 137 | 137 | 137 |
| 1.1 | Silica | 60 | 60 | 60 | 60 | 60 | 60 | 60 |
| 1.1 | Monotetrazole 3.1 (Ta 190° C.) | — | — | 5.2* | — | — | — | 8.5** |
| 1.1 | Monotetrazole 3.4 (Ta 140° C.) | — | — | — | 3* | — | — | — |
| 1.1 | TESPT | 3 | — | — | — | 4.8 | — | — |
| 1.1 | APTES | | 2.5* | | | | 3.9** | |

TABLE 3-continued

| elastomeric compositions | | | | | | | | |
|---|---|---|---|---|---|---|---|---|
| Step | Ingredients phr (% pp) | Ex. 5.1 | Ex. 5.2 | Ex. 5.3 | Ex. 5.4 | Ex. 5.5 | Ex. 5.6 | Ex. 5.7 |
| 1.1 | 6PPD | 2.5 | 2.5 | 2.5 | 2.5 | 2.5 | 2.5 | 2.5 |
| 1.2 | Stearic acid | 1 | 1 | 1 | 1 | 1 | 1 | 1 |
| 1.2 | ZnO (80%) | 2 | 2 | 2 | 2 | 2 | 2 | 2 |
| 2.0 | CBS | 3 | 3 | 3 | 3 | 3 | 3 | 3 |
| 2.0 | Sulphur (67%) | 1 | 1 | 1 | 1 | 1 | 1 | 1 |

wherein:

*equal equivalents vs TESPT of Ex. 5.1;

**equal equivalents vs TESPT of Ex. 5.5;

the TESPT is 5% by weight in Example 5.1 and 8% by weight in Example 5.5 with respect to the weight of the filler (silica);

step 1.0-1.2: non-productive step or step (i);

step 2.0: productive step or step (ii);

SBR: styrene-butadiene copolymer from solution extended with 37.5 phr of TDAE oil for every 100 phr of dry elastomeric polymer, supplier TRINSEO Silica: ZEOSIL 1165 MP, supplier Solvay Rhodia Operations Silane: TESPT supplier JINGZHOU JIANGHAN FINE CHEM APTES: Dynasilan AMEO supplier EVONIK Stearic acid: supplier TEMIX OLEO SRL 6PPD: N-(1,3-dimethylbutyl)-N'-phenyl-p-phenylenediamine, supplier: Eastman ZnO (80): 80% zinc oxide, 20% polymeric binder and dispersing agent, supplier Lanxess Add CBS: N-cyclohexyl-2-benzothiazyl sulphenamide, cyclohexylamine content <1%, supplier Duslo Sulphur: Crystex OT33 amorphous sulphur, insoluble in $CS_2$ and in toluene. Treated with 33% hydrotreated heavy naphthenic distillate (petroleum), supplier Eastman.

The mixing was carried out in several steps using an internal Brabender laboratory tangential rotor mixer (60 ml mixing chamber).

In the first step (1-0), 50% of the elastomer was introduced and chewed for 30 seconds at 140° C. (set temperature).

In the following step (1.1) the monotetrazole compatibilizing agent (I), the TESPT silane or APTES, the silica, and the remaining elastomer were added. The mixing was continued for 2 minutes, at 140° C.

Subsequently in step 1.2 the antioxidant, the ZnO and the stearic acid were introduced. The mixing was continued for about 2 minutes, until the reaction between stearic acid and zinc was completed, again at 140° C. after which the compounds—called first step compounds—were discharged, and tested for their rheological properties.

After 12-24 hours, in step (ii), carried out using the same mixer, the vulcaniser (sulphur) and the accelerant CBS were introduced, and the mixing continued for about 3 minutes at 90° C., when the final compounds were discharged and tested again for their dynamic and rheological properties.

Dynamic Rheological and Mechanical Properties

The first and final step compounds, comparative and according to the invention, were subjected to analysis of the dynamic mechanical and rheological properties, according to the previously described methods.

FIGS. 8-10 show the trend of the rheogram S' (dNm)/time (min) curves.

In particular, FIG. 8 shows the curve of the pair S' measured on samples heated to 190° C. of first step compounds of comparative Examples 5.5 (TESPT) and 5.6 (APTES) and of Example 5.7 of the invention (monotetrazole 3.1) at 8% by weight with respect to silica.

From the S' curve, measured in the absence of a sulphur vulcanising system, it is possible to evaluate the effect of consolidation of the compound by the compatibiliser alone.

The TESPT silane as expected releases sulphur which cross-links the compound, as demonstrated by the increase in S'.

The APTES silane normally has the role of catalyst of the vulcanisation package but does not cross-link, and in fact the value of S' is unchanged once the test T is reached.

As regards the monotetrazole 3.1 of the invention, the very low starting value of S' testifies to the high degree of compatibilisation of the silica in the compound and the suppression of the interaction between the silica particles which is typically obtained when an excellent dispersion is achieved.

FIG. 9 shows the curve of the torque S' of samples heated to 190° C. of final compounds of comparative Examples 5.5 (TESPT) and 5.6 (APTES) and of the invention 5.7 (monotetrazole 3.1) at 8% by weight with respect to silica.

The following Table 4 shows the measured elastic modulus G' and viscous G" values for the comparative samples of Ex. 5.5 and 5.6 and of the invention of Ex 5.7:

TABLE 4

| Final compounds | | Ex. 5.5 Comp. TESPT | Ex. 5.6 Comp. APTES | Ex. 5.7 Inv. Tetrazole 3.1 |
|---|---|---|---|---|
| Crude | G'9% (KPa) | 611.05 | 720.09 | 427.23 |
| | ΔG (0.5-10%) | 134.47 | 305.17 | 174.48 |
| Vulcanised | G'9% (KPa) | 1260.23 | 1526.42 | 713.47 |
| (190° C. × | ΔG (0.5-10%) | 347.01 | 727.57 | 242.14 |
| 30 min.) | G" 9% (KPa) | 128.05 | 210.79 | 104.83 |

8% with respect to silica

From the data reported in Table 4 and from the curve of FIG. 9, it was observed that the sample containing the monotetrazole 3.1 according to the invention had a reduced modulus of the final green compounds with respect to the comparative compounds.

This behaviour is attributable to good compatibility and filler dispersion.

The vulcanisation curve of FIG. 9 testifies to a kinetic profile of the compound according to the invention, comprising monotetrazole 3.1, comparable with those of the reference compounds.

Comparing the modules before and after vulcanisation, it can be seen that the increase in the deformation module to 9%, following vulcanisation, of the samples containing the two reference compounds (of about 700 KPa) is more marked than that of the sample according to the invention (of about 300 KPa).

This result may depend on the fact that the reference compounds, with different mechanisms, can increase the cross-linking of the elastomer unlike the tetrazoles of the invention. It is in fact known to those skilled in the art that the TESPT silane can act as a sulphur donor and contribute to the formation of the disulphide bridges of the lattice. It is also known [see for example Journal of Applied Polymer Science, Vol. 123, 2805-2811 (2012)] that the APTES silane can contribute to the formation of the sulphur lattice as it acts as a vulcanisation accelerant. As regards the monotetrazole 3.1 of the invention, the reactivity of the silane is independent of the sulphur cross-linking reaction, therefore its contribution to the mechanical reinforcement of the vulcanised is lower.

FIG. 10 shows the curve of the torque S' of samples heated to 190° C. of final compounds of comparative Examples 5.1 (TESPT) and 5.2 (APTES) and of the invention 5.3 (monotetrazole 3.1) and 5.2 (monotetrazole 3.4) at 5% by weight with respect to silica.

The following Table 5 shows the measured elastic modulus G' and viscous G" values for the comparative samples of Ex. 5.1 and 5.2 and of the invention of Ex 5.3 and 5.4:

TABLE 5

| Final compounds | | Ex. 5.1 Comp TESPT | Ex. 5.2 Comp. APTES | Ex. 5.3 Inv. Tetrazole 3.1 | Ex. 5.4 Inv. Tetrazole 3.4 |
|---|---|---|---|---|---|
| Crude | G'9% (KPa) | 784,46 | 967.57 | 758.76 | 934.07 |
| | ΔG (0.5-10%) | 210.63 | 442.95 | 628.70 | 449.69 |
| Vulcanised | G'9% (KPa) | 1486.75 | 2017.30 | 1631.10 | 1933.43 |
| (190° C. × | ΔG (0.5-10%) | 413.21 | 970.82 | 1237.11 | 1057.93 |
| 30 min.) | G" 9% (KPa) | 151.24 | 269.41 | 269.61 | 283.89 |

5% with respect to silica

The values of modulus G' and G" of the vulcanised shown in Table 5 are in line with the values of G' of the green and testify differences mainly due to the state of dispersion.

In summary, the monotetrazoles of the invention show the classic rheological effect on the compound of a compatibiliser modifying the surface of the conventional filler, i.e. a reduction of the G' modulus as the quantity of the compatibiliser increases and its polarity decreases.

Indeed, as shown by the samples of the Ex. 5.5 and Ex. 5.1, comprising respectively TESPT in quantities equal to 8% and 5% of the silica (Table 4 vs Table 5), the effect on the mechanical properties of the compound caused by the surface modification is particularly evident with higher quantities of compatibiliser.

In conclusion, in line with the dynamic and rheological properties, the compatibilisers according to the invention allow to proceed only with the compatibilisation of the filler without affecting the cross-linking, unlike the traditional compatibilisers, where the two functions are co-present and where the scarcely controllable triggering of the sulphur cross-linking can occur early in situations of non-optimal filler dispersion. With the present monotetrazole agents, on the other hand, it is possible to proceed with the ideal dispersion of the filler without interfering with the cross-linking and without having to exercise a strict control on the mixing temperatures, with undoubted advantages both in terms of mechanical performance of the improved materials and at a process level.

Static Mechanical Properties

Samples of the compounds of the examples according to the invention and comparative, vulcanised at 190° C. for 30 minutes, were subjected to the evaluation of the static mechanical properties. The results of these tests are shown in the following Table 6:

TABLE 6

| Compatib. | Ex. 5.1 TESPT* | Ex. 5.2 APTES* | Ex. 5.3 3.1* | Ex. 5.4 3.4* | Ex. 5.5 TESPT** | Ex. 5.6 APTES** | Ex. 5.7 3.1** |
|---|---|---|---|---|---|---|---|
| | Comp | Comp | Inv | Inv | Comp | Comp | Inv |
| Ca0.5 | 2.0 | 1.5 | 1.4 | 1.5 | 1.7 | 1.5 | 1.0 |
| Ca1 | 3.5 | 1.9 | 1.4 | 1.9 | 3.1 | 2.0 | 2.7 |
| Ca3 | 7.6 | 5.0 | 5.4 | 5.3 | 13.3 | 5.8 | 4.6 |
| CR | 15.8 | 14.4 | 18.5 | 18.9 | 17.5 | 14.7 | 13.8 |
| AR % | 347 | 612 | 659 | 699 | 368 | 547 | 589 |

wherein Ca in MPa;
*5% vs silica;
**8% vs silica

From the values reported in Table 5, it can be observed that at more reduced quantities of compatibiliser compared to the samples of FIG. 9 (Ex. 5.5-5.7), the G' values of the green samples of compounds containing APTES (Ex. 5.2), monotetrazole 3.4 (Ex. 5.4) are higher than the sample containing TESPT (Ex. 5.1). This behaviour could depend on the greater polarity, compared to TESPT, of APTES and monotetrazole 3.4 which would guarantee a higher interaction with the filler, consequently increasing the mechanical reinforcement.

From the vulcanisation curves of FIG. 10, a comparable kinetic profile is again observed for all samples.

The precise strain load values of 50%, 100% and 300% classify the samples containing TESPT as more rigid to traction, due to its ability to contribute to sulphur vulcanisation.

On the other hand, the elongations at break are far lower than those obtainable with all the other compatibilisers. Considering that in general it is difficult to obtain a good compromise between mechanical reinforcement (expressed for example as Ca3) and elongation at break, the compatibilisers of greatest interest in this study are the monotetrazoles of the invention 3.1 and 3.4.

In conclusion, from the tests carried out and from the results of the above tests it appeared that the monotetrazole compatibilizing agent (I) of the invention incorporated in tyre compounds had a marked compatibilisation effect, especially at higher concentrations, as demonstrated by the G' values of the green and vulcanised compounds, particularly beneficial on the breaking properties of the vulcanised compound, in comparison with the commercial silanes APTES and TESPT.

These results make it possible to use the compatibilizing agents of the invention in compounds for tyres as an alternative to the traditional compatibilisers, however enjoying the undoubted advantage of the simplification of the preparation process linked to the possibility of being able to trigger the reaction of the compatibilizing agent with the elastomer to a precise predetermined temperature, for example only during vulcanisation, and therefore of being able to process the compound longer without having to exercise a strict temperature control.

The final compounds of the invention exhibit optimal properties as they combine considerable mechanical reinforcement and excellent breaking properties.

The invention claimed is:

1. An elastomeric composition for tyre compounds comprising:

at least 100 phr of at least one diene elastomeric polymer, at least 1 phr of at least a reinforcing filler, at least 0.1 phr of at least a monotetrazole compatibilizing agent of formula (I):

(I)

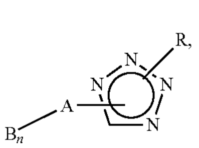

wherein

A is absent or represents an at least divalent organic group linker, optionally comprising one or more hetero-atom(s), covalently bound to the position 2 or 5 of the tetrazole;

R is a group covalently bound to position respectively 5 or 2 of the tetrazole, chosen from the group consisting of linear or branched $C_1$-$C_{10}$ alkyl; $C_6$-$C_{20}$ aryl; $C_3$-$C_{10}$ cycloalkyl; and a saturated, unsaturated or aromatic mono or bicyclic, 5- or 6-membered, optionally benzocondensated, heterocyclyl comprising at least one heteroatom chosen from the group consisting of N, S, O; R is optionally substituted with at least one electron withdrawing group X or an electron donor group Y; or R is a group B, B represents a group with high affinity for the reinforcing filler, chosen from the group consisting of a silane substituted with $C_1$-$C_5$ alkoxyls, $C_1$-$C_5$ alkyls and/or $C_6$-$C_{10}$ aryls, a boronic acid group with the formula $(HO)_2B$—, a saturated, unsaturated or aromatic mono or bicyclic, 5- or 6-membered, optionally benzocondensated, heterocyclyl, comprising at least one heteroatom chosen from the group consisting of N, S and O, and an aromatic polycyclic hydrocarbon n is an integer ranging from 1 to 3, wherein groups A, B and R do not comprise any 2,5 disubstituted tetrazole; and from 0 phr to 20 phr of a vulcanising agent.

2. The composition according to claim 1, wherein:

the diene elastomeric polymer is chosen from the group consisting of cis-1,4-polyisoprene natural or synthetic, 3,4-polyisoprene, polybutadiene, optionally halogenated isoprene/isobutene copolymers, 1,3-butadiene/acrylonitrile copolymers, styrene/1,3-butadiene copolymers, styrene/isoprene/1,3-butadiene copolymers, styrene/1,3-butadiene/acrylonitrile copolymers, and mixtures thereof;

the reinforcing filler is chosen from the group consisting of optionally modified carbon black, silica, silicates, chalk, talc, kaolin, bentonite, titanium dioxide, and mixtures thereof;

the at least one vulcanising agent is chosen from the group consisting of sulphur, sulphur-containing molecules, sulphur donors or polytetrazole cross-linkers and mixtures thereof.

3. The composition according to claim 1, wherein the composition comprises:

from 1 phr to 150 phr of the at least one reinforcing filler;

from 0.1 to 10 phr of the at least one vulcanising agent;

from 0.5 phr to 30 phr of the at least one monotetrazole compatibilizing agent of formula (I); or any combination thereof.

4. The composition according to claim 1, wherein the composition comprises the at least one monotetrazole compatibilizing agent of formula (I), and the at least one reinforcing filler in a weight ratio between 0.01:1 and 0.3:1.

5. The composition according to claim 1, wherein A has a molecular weight less than 1000 g/mol.

6. The composition according to claim 1, wherein A is present and is chosen from the group consisting of $C_1$-$C_{10}$ alkylene; $C_6$-$C_{10}$ arylene; mono or bicyclic, 5- or 6-membered, saturated, unsaturated or aromatic, optionally benzocondensated, heterocyclylene comprising at least one heteroatom chosen from N, S and O; $C_1$-$C_5$ alkylene-$C_6$-$C_{10}$ arylene-; $C_6$-$C_{10}$-arylene-$C_1$-$C_5$ alkylene; $C_1$-$C_5$ alkylene-$C_6$-$C_{10}$ arylene-$C_1$-$C_5$ alkylene; $C_1$-$C_5$ alkylene-heterocyclylene-; heterocyclylene-$C_1$-$C_5$ alkylene; $C_1$-$C_5$ alkylene-heterocyclylene-$C_1$-$C_5$ alkylene; $C_6$-$C_{10}$ arylene-$C_6$-$C_{10}$ arylene; heterocyclylene-heterocyclylene; $C_6$-$C_{10}$ arylene-$C_1$-$C_5$ alkylene-$C_6$-$C_{10}$-arylene; and heterocyclylene-$C_1$-$C_5$ alkylene-heterocyclylene wherein the alkylene optionally comprises one or more heteroatoms chosen from the group consisting of B, N, S, O, P and Si or functionalised groups chosen from the group consisting of —$NR_3$—CO—, —CO—$NR_3$-,—NH—CO—NH—,—COO—, —O—CO—,—CO—,—C=N($R_3$)—,—CO—N($R_3$)—CO—,—C=N(OH)—,—O—CO—N($R_3$)—,—N($R_3$)—COO—,—SO—,—$SO_2$—,—$SO_2$O—,—CS—,—CS—O—,—COS—, and —CS—S—, wherein $R_3$ is hydrogen or $C_1$-$C_5$ alkyl.

7. The composition according to claim 1, wherein R is chosen from the group consisting of $C_1$-$C_6$ alkyl, $C_6$-$C_{10}$ aryl, $C_1$-$C_5$ alkyl-$C_6$-$C_{10}$ aryl, $C_6$-$C_{10}$ aryl-$C_1$-$C_5$ alkyl, $C_3$-$C_7$ cycloalkyl, and mono or bicyclic, 5- or 6-membered, saturated, unsaturated or aromatic, optionally benzocondensated, heterocyclyl comprising at least one heteroatom chosen from the group consisting of N, S and O.

8. The composition according to claim 1, wherein B is chosen from the group consisting of formula-Si(OR1)$_3$ wherein $R_1$, equal or different from each other, are $C_1$-$C_5$ alkyl, and a polycyclic aromatic hydrocarbon, chosen from the group consisting of naphthalene, phenanthrene, anthracene, pyrene, benzopyrene, fluorene, and benzocondensate derivatives of the polycyclic aromatic hydrocarbons.

9. The composition according to claim 1, wherein the monotetrazole compatibilizing agent (I) has a molecular weight less than 1500 g/mol.

10. The composition according to claim 1, wherein the monotetrazole compatibilizing agent (I) has an activation temperature Ta not less than 100° C. and not more than 220° C.

11. The composition according to claim 1, wherein R is substituted by at least one electron withdrawing group X, or R is substituted by at least one electron donor group Y.

12. The composition according to claim 11, wherein R is substituted by at least one electron withdrawing group X chosen from the group consisting of halogen, carbonyl, carboxyl, ester, cyano, nitro, halo-alkyl and sulphonyl or R is substituted by at least one electron donor group Y chosen from the group consisting of hydroxy, $C_1$-$C_{10}$ alkoxy, benzyloxy, $C_1$-$C_{10}$ alkyl, amino, amino monosubstituted with $C_1$-$C_{10}$ alkyl, amino disubstituted with $C_1$-$C_{10}$ alkyl, primary amide (—NH—COR), and hydrazonyl (—CH=N—$NR_2$).

13. The composition according to claim 1, wherein the monotetrazole compatibilizing agent is an agent of formula (I-A):

(I-A)

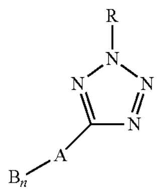

or an agent of formula (I-B):

(I-B)

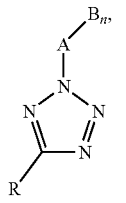

wherein A is present and is a divalent organic group, n is equal to 1, and R is different from B.

14. The composition according to claim 13, wherein the monotetrazole compatibilizing agent is an agent of formula (I-A) wherein:

A is a divalent organic group of formula-A1-A2-, wherein A1 is absent or chosen from —$(CH_2)_{(2-4)}$—NH—C(O)— and —$(CH_2)_{(2-4)}$—NH—C(O)—NH—, and wherein A2 is absent or chosen from phenyl and thiophene;

R is chosen from the group consisting of $C_4$-$C_6$ alkyl, benzyl, phenyl and thiophene, optionally substituted by at least one electron withdrawing group X or electron donor group Y, B is chosen from the group consisting of —$Si(OR1)_3$, wherein $R_1$ is $C_1$-$C_3$ alkyl, the boronic acid group with the formula $(HO)_2B$—, naphthyl and pyrenyl.

15. The composition according to claim 1, wherein n is equal to 1 and A represents a divalent organic group.

16. The composition according to claim 15, wherein the composition comprises:

from 1 phr to 150 phr of the at least one reinforcing filler;

from 0.1 to 10 phr of the at least one vulcanising agent;

from 0.5 phr to 30 phr of the at least one monotetrazole compatibilizing agent of formula (I); or any combination thereof.

17. The composition according to claim 15, wherein A has a molecular weight less than 1000 g/mol.

18. The composition according to claim 15, wherein B is chosen from the group consisting of formula-$Si(OR1)_3$ wherein $R_1$, equal or different from each other, are $C_1$-$C_5$ alkyl, and a polycyclic aromatic hydrocarbon, chosen from the group consisting of naphthalene, phenanthrene, anthracene, pyrene, benzopyrene, fluorene, and benzocondensate derivatives of the polycyclic aromatic hydrocarbons.

19. An elastomeric compound for tyres obtained by mixing and vulcanising the elastomeric composition according to claim 1.

20. A process for preparing an elastomeric compound according to claim 19 comprising:

mixing, in one or more steps, the composition keeping a mixing temperature at a value T1 lower than an activation temperature Ta of the at least one monotetrazole compatibilizing agent (I), to give a compound (1) comprising the monotetrazole compatibilizing agent (I) with the tetrazole unreacted, heating the compound (1) to a temperature T2 equal to or higher than the activation temperature Ta of the monotetrazole compatibilizing agent (I), to give a compound (2), wherein the at least one monotetrazole compatibilizing agent (I) has reacted at least partially by tetrazole decomposition and subsequent addition to the diene elastomeric polymer, and vulcanising the compound (2).

21. The process according to claim 20, wherein the temperature T1 is less than at least 10° C. than the activation temperature Ta of the at least one monotetrazole compatibilizing agent (I), and wherein the temperature T2 is higher by at least 10° C. than the activation temperature Ta of the at least one monotetrazole compatibilizing agent (I).

22. The process according to claim 20, wherein the step of heating the compound (1) at a temperature T2 equal to or higher than the activation temperature Ta of the monotetrazole compatibilizing agent (I), coincides with the step of vulcanising the compound (2).

23. A process for preparing an elastomeric compound according to claim 19, comprising:

mixing, in one or more steps, the composition keeping a temperature at a value T1 lower than an activation temperature Ta of the at least one monotetrazole compatibilizing agent (I), to give a compound (1) comprising the monotetrazole compatibilizing agent (I) with the tetrazole unreacted, and vulcanising the compound at a temperature below the activation temperature Ta of the at least one monotetrazole compatibilizing agent, to give a vulcanised compound comprising the monotetrazole compatibilizing agent (I) with the tetrazole unreacted.

24. A tyre component for vehicle wheels comprising an elastomeric compound according to claim 19, wherein the component is chosen from the group consisting of a tread band, an underlayer, an anti-abrasive layer, a sidewall, a sidewall insert, a mini-sidewall, a liner, an under-liner, rubber layers, a filler, bead reinforcement layers, bead protection layers, and a sheet.

25. A tyre for vehicle wheels comprising at least one tyre component as claimed in claim 24.

* * * * *